(12) United States Patent
Rotaru et al.

(10) Patent No.: US 11,481,733 B2
(45) Date of Patent: Oct. 25, 2022

(54) AUTOMATED INTERFACES WITH INTERACTIVE KEYWORDS BETWEEN EMPLOYMENT POSTINGS AND CANDIDATE PROFILES

(71) Applicant: Textkernel BV, Amsterdam (NL)

(72) Inventors: Mihai Rotaru, Voorschoten (NL); Tijs Van Tilburg, Den Dolder (NL); Alex Antipin, Amsterdam (NL); Mauricio Minella, Amsterdam (NL); Laura Starreveld, Amsterdam (NL); Alexandre Paiva, Arnhem (NL); Viktoria Bancheva, Aalsmeer (NL)

(73) Assignee: Textkernel BV, Amsterdam (NL)

(*) Notice: Subject to any disclaimer, the term of this patent is extended or adjusted under 35 U.S.C. 154(b) by 219 days.

(21) Appl. No.: 16/728,275

(22) Filed: Dec. 27, 2019

(65) Prior Publication Data

US 2020/0210958 A1 Jul. 2, 2020

Related U.S. Application Data

(60) Provisional application No. 62/786,122, filed on Dec. 28, 2018.

(51) Int. Cl.
*G06Q 10/10* (2012.01)
*G06F 16/9535* (2019.01)
(Continued)

(52) U.S. Cl.
CPC ......... *G06Q 10/1053* (2013.01); *G06F 16/22* (2019.01); *G06F 16/24578* (2019.01); *G06F 16/9535* (2019.01); *G06F 40/205* (2020.01)

(58) Field of Classification Search
CPC .............. G06Q 10/1053; G06Q 50/01; G06Q 10/063112; G06Q 10/10; G06Q 30/0629;
(Continued)

(56) References Cited

U.S. PATENT DOCUMENTS 6,385,620 B1 * 5/2002 Kurzius ................. G06Q 10/10
2015/0006422 A1 * 1/2015 Carter ................ G06Q 10/1053
705/321

(Continued)

FOREIGN PATENT DOCUMENTS

WO WO-2015175652 A1 * 11/2015 ......... G06Q 10/1053

OTHER PUBLICATIONS

Gordon Whitson, "Chrome for Android Can Instantly Search Any Text You Highlight on Google", Retrieved from https://lifehacker.com/chrome-for-android-can-instantly-search-any-text-you-hi-1709132529, Jun. 4, 2015, 3 Pages (Year: 2015).*

(Continued)

*Primary Examiner* — Dennis W Ruhl
*Assistant Examiner* — Ivonnemary Rivera Gonzalez
(74) *Attorney, Agent, or Firm* — Neal, Gerber & Eisenberg LLP

(57) ABSTRACT

Automated interfaces with interactive keywords between employment postings and candidate profiles are disclosed. An example system includes a profile database and one or more processors. The one or more processors are configured to identify one or more posting keywords by parsing extracted text of an employment posting, retrieve one or more posting search-terms from a search-term database based on the one or more posting keywords, and generate a list of candidates based on one or more candidate profiles retrieved from the profile database. Further, the one or more processors are configured to present, to the recruiter, an interface that includes a posting section and a candidate section adjacent to the posting section. Further, the one or more processors are configured to typographically emphasize the posting keywords that are associated with the posting search-terms to indicate relationships between the employment posting and the list of candidates.

20 Claims, 23 Drawing Sheets

(51) Int. Cl.
*G06F 40/205* (2020.01)
*G06F 16/2457* (2019.01)
*G06F 16/22* (2019.01)

(58) Field of Classification Search
CPC .......... G06Q 30/0641; G06Q 30/0643; G06Q 30/0631; G06Q 10/105; G06F 16/9535; G06F 40/205; G06F 16/24578; G06F 16/22; G06F 40/284; G06F 40/106; G06F 16/9536; G06F 16/3344; G06F 16/954
See application file for complete search history.

(56) References Cited

U.S. PATENT DOCUMENTS

| | | | |
|---|---|---|---|
| 2016/0232160 A1* | 8/2016 | Buhrmann | G06F 40/14 |
| 2017/0270485 A1* | 9/2017 | Meier | G06Q 10/1053 |
| 2019/0019160 A1* | 1/2019 | Champaneria | G06F 16/951 |
| 2019/0138645 A1* | 5/2019 | Zhang | G06F 16/332 |
| 2019/0318317 A1* | 10/2019 | Sergott | G06Q 10/1053 |

OTHER PUBLICATIONS

Hu, "7 Reasons Jobscan is More Effective than Word Cloud Tools", Apr. 5, 2018 (Year: 2018).*

Qi Guo et. al.,"The AI Behind LinkedIn Recruiter search and recommendation systems", Apr. 22, 2019 (Year: 2019).*

* cited by examiner

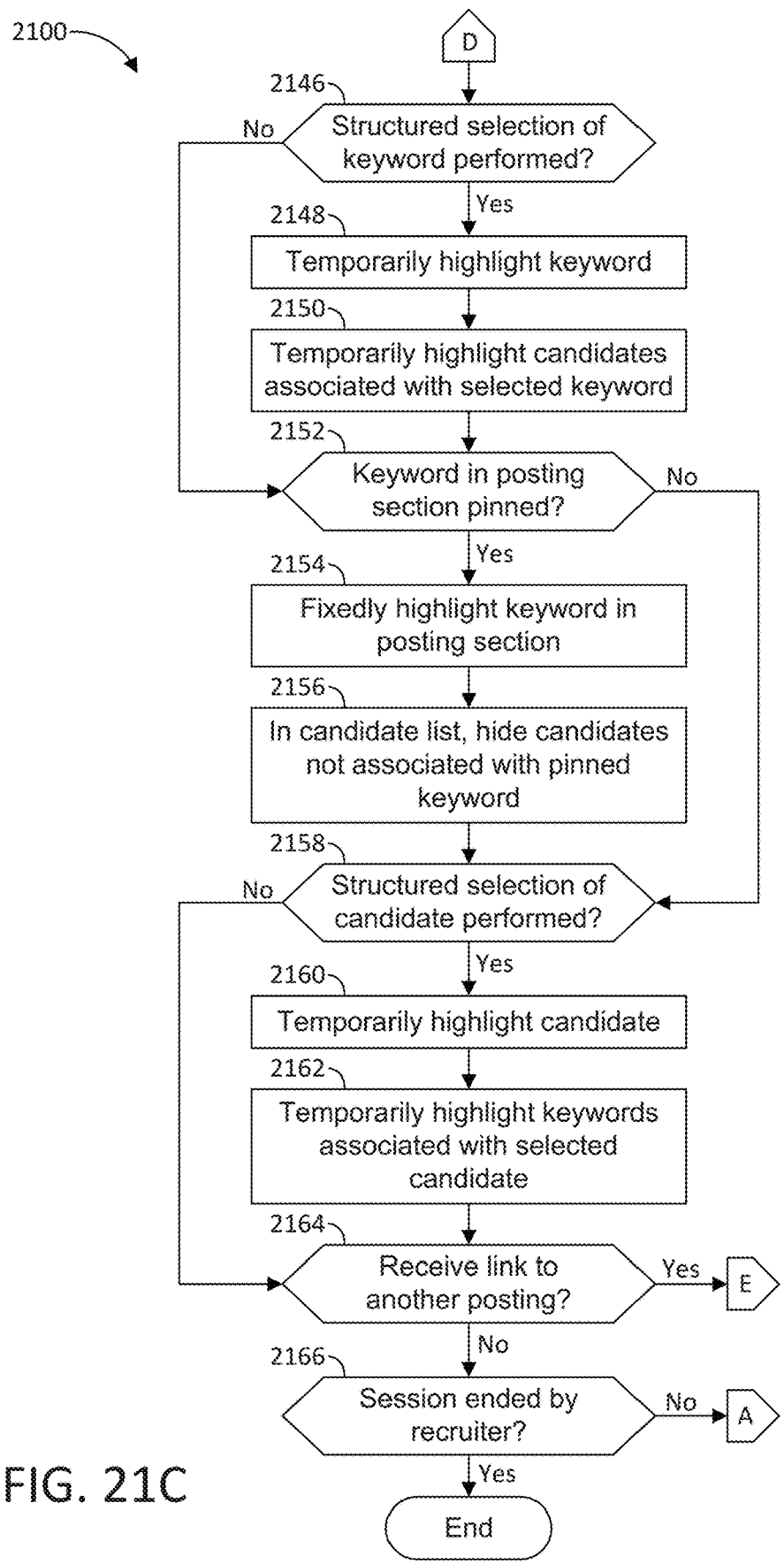

AUTOMATED INTERFACES WITH INTERACTIVE KEYWORDS BETWEEN EMPLOYMENT POSTINGS AND CANDIDATE PROFILES

CROSS REFERENCE TO RELATED APPLICATION

This application claims the benefit of U.S. Provisional Patent Application No. 62/786,122, which was filed on Dec. 28, 2018, the contents of which are fully incorporated herein by reference.

TECHNICAL FIELD

The present disclosure generally relates to employment postings and, more specifically, to automated interface with interactive keywords between employment posting and candidate profiles.

BACKGROUND

Employment websites (CareerBuilder.com®) generally are utilized to facilitate employers in hiring job seekers for open positions. Oftentimes, an employment website incorporates a job board on which employers may post the open positions they are seeking to fill. In some instances, the job board enables an employer to include duties of the posted position and/or desired or required qualifications of job seekers for the posted position. Further, some employment websites enable a job seeker to search through positions posted on the job board. If the job seeker identifies a position of interest, the employment website may provide an application to the job seeker and/or enable the job seeker to submit a completed application, a resume, and/or a cover letter to the employer.

Some employment websites include tens of thousands of job seekers may be seeking employment in a particular region. Further, some job seekers may submit applications and/or resumes to positions for which they are unqualified (e.g., a retail cashier applying for a position as a CEO). Thus, an employer may be inundated with applications and/or resumes submitted by (qualified and unqualified) job seekers. As a result, employers potentially may find it difficult to identify job seekers qualified for their posted position.

Further, some employment website allow employers to search for potential candidates in an attempt to avert those employers from being overwhelmed by applications of unqualified job seekers. For instance, some employment websites my generate a list of job seekers based on desired qualifications and/or skills identified by an employer. Oftentimes, employers may find it difficult to understand why one or more of candidates are included in the list of job seekers generated by the employment web site.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for automated interface with interactive keywords between employment posting and candidate profiles. An example disclosed system for automatically presenting candidates for an employment posting to a recruiter includes a profile database configured to store candidate profiles of the candidates. The candidate profiles include profile keywords. The example disclosed system also includes one or more processors of an employment website entity. In real-time during a session of the recruiter on an employment web site or app of the employment web site entity, the one or more processors are configured to access the employment posting, extract text of the employment posting, identify one or more posting keywords by parsing the extracted text of the employment posting, retrieve one or more posting search-terms for the employment posting from a search-term database based on the one or more posting keywords. The search-term database stores associations between keywords and search-terms. In real-time during the session of the recruiter on the employment website or app of the employment website entity, the one or more processors are configured to retrieve one or more of the candidate profiles from the profile database based on the one or more posting search-terms and generate a list of candidates based on the one or more of the candidate profiles retrieved from the profile database. Further, in real-time during the session of the recruiter on the employment website or app of the employment website entity, the one or more processors are configured to present, to the recruiter, an interface that includes a posting section and a candidate section adjacent to the posting section. The posting section includes the text of the employment posting and the candidate section includes the list of candidates to enable simultaneously viewing of the employment posting and the list of candidates corresponding with the employment posting. Further, in real-time during the session of the recruiter on the employment website or app of the employment website entity, the one or more processors are configured to typographically emphasize the posting keywords that are associated with the posting search-terms within the posting section to indicate relationships between the employment posting and the list of candidates to the recruiter.

In some examples, the one or more processors are configured to generate the candidate profiles stored in the profile database based on, at least in part, resumes of candidates collected via the employment website or app. In some such examples, to identify the profile keywords within the resumes of the candidates, the one or more processors are configured to extract and parse text of the resumes.

In some examples, to access the employment posting, the one or more processors are configured to receive a uniform resource locator from the recruiter via the employment website or app. In some examples, the one or more processors are configured to access the employment posting via a built-in widget.

In some examples, to generate the list of candidates, the one or more processors are configured to rank the one or more candidate profiles that correspond with the one or more posting search-terms. In some such examples, the one or more processors are configured to utilize the one or more posting search-terms that are identified based on the one or more posting keywords to increase a quality of a ranking of the one or more candidate profiles.

In some examples, the posting section and the candidate section are positioned side-by-side with respect to each other within the interface. In some examples, to typographically emphasize the posting keywords within the posting section, the one or more processors are configured to modify a typographical color of the posting keywords. In some such examples, the one or more processors are configured to color code different types of keywords with different respective colors.

In some examples, the one or more processors are configured to determine when the recruiter is performing a structured selection of a first posting keyword of the one or more posting keywords that are typographically emphasized within the posting section and temporarily highlight, within the candidate section, at least one candidate in the list of candidates that correspond with the first posting keyword while the structured selection is being performed.

In some examples, the one or more processors are configured to determine when the recruiter is performing a structured selection of a first candidate in the list of candidates within the candidate section and temporarily highlight, within the posting section, at least one of the one or more posting keywords that correspond with the first candidate while the structured selection is being performed.

In some examples, in response to the recruiter pinning a first posting keyword of the one or more posting keywords within the posting section, the one or more processors are configured to fixedly highlight the first posting keyword within the posting section and dynamically hide, within the candidate section, each candidate in the list of candidates that does not correspond with the first posting keyword.

In some examples, the one or more processors are configured to receive an additional search-term from the recruiter via the interface and dynamically adjust the list of candidates based on the additional search-term. In some such examples, the one or more processors are configured to receive the additional search-term via a textbox of the interface. In some such examples, to receive the additional search-term, the one or more processors are configured to identify when the recruiter has performed a freeform selection of a portion of the text of the employment posting within the posting section, automatically convert the portion into another posting keyword, retrieve one or more additional search-terms from the search-term database based on the other posting keyword, and dynamically adjust the list of candidates based on the one or more additional search-terms.

In some examples, the one or more processors are configured to present an expanded candidate summary within the candidate section in response to determining that the recruiter has performed a structured selection of a corresponding candidate name within the list of candidates in the candidate section.

In some examples, in response to the recruiter performing a structured selection of a radar button of the interface, the one or more processors are configured to present, in the candidate section, a portion of a candidate profile for each candidate within the list of candidates, determine when the recruiter performs a structured selection of a first posting keyword of the one or more posting keywords typographically emphasized within the posting section, and temporarily highlight the first posting keyword within one or more of the candidate profiles within the candidate section while the structured selection is being performed.

An example disclosed method for automatically presenting candidates for an employment posting in real-time during a session of a recruiter on an employment website or app of an employment website entity includes accessing, via one or more processors, the employment posting and extracting, via the one or more processors, text of the employment posting. The example disclosed method includes identifying, via the one or more processors, one or more posting keywords by parsing the extracted text of the employment posting and retrieving, via the one or more processors, one or more posting search-terms for the employment posting from a search-term database based on the one or more posting keywords. The search-term database stores associations between keywords and search-terms. The example disclosed method includes retrieving, via the one or more processors, one or more of the candidate profiles from a profile database based on the one or more posting search-terms. The profile database stores candidate profiles of the candidates, and the candidate profiles include profile keywords. The example disclosed method includes generating, via the one or more processors, a list of candidates based on the one or more of the candidate profiles retrieved from the profile database and presenting, via the one or more processors, an interface to the recruiter. The interface includes a posting section and a candidate-list block adjacent to the posting section. The posting section includes the text of the employment posting and the candidate list block includes the list of candidates to enable simultaneously viewing of the employment posting and the list of candidates corresponding with the employment posting. The example disclosed method includes typographically emphasizing, via the one or more processors, the posting keywords that are associated with the posting search-terms within the posting section to indicate relationships between the employment posting and the list of candidates to the recruiter.

An example disclosed tangible computer readable medium including instructions which, when executed, cause a machine to automatically present candidates for an employment posting in real-time during a session of a recruiter on an employment website or app of an employment website entity. The instructions cause the machine to access the employment posting, extract text of the employment posting, identify one or more posting keywords by parsing the extracted text of the employment posting, and retrieve one or more posting search-terms for the employment posting from a search-term database based on the one or more posting keywords. The search-term database stores associations between keywords and search-terms. Further, the instructions causing the machine to retrieve one or more of the candidate profiles from a profile database based on the one or more posting search-terms. The profile database stores candidate profiles of the candidates, and the candidate profiles include profile keywords. Further, the instructions causing the machine to generate a list of candidates based on the one or more of the candidate profiles retrieved from the profile database and present, to the recruiter, an interface that includes a posting section and a candidate-list block adjacent to the posting section. The posting section includes the text of the employment posting and the candidate list block includes the list of candidates to enable simultaneously viewing of the employment posting and the list of candidates corresponding with the employment posting. Further, the instructions causing the machine to typographically emphasize the posting keywords that are associated with the posting search-terms within the posting section to indicate relationships between the employment posting and the list of candidates to the recruiter.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

FIGS. 21A-21C depict a flowchart for generating an automated interface with interactive keywords between an employment posting and candidate profiles.

DETAILED DESCRIPTION OF EXAMPLE EMBODIMENTS

Figure 1:
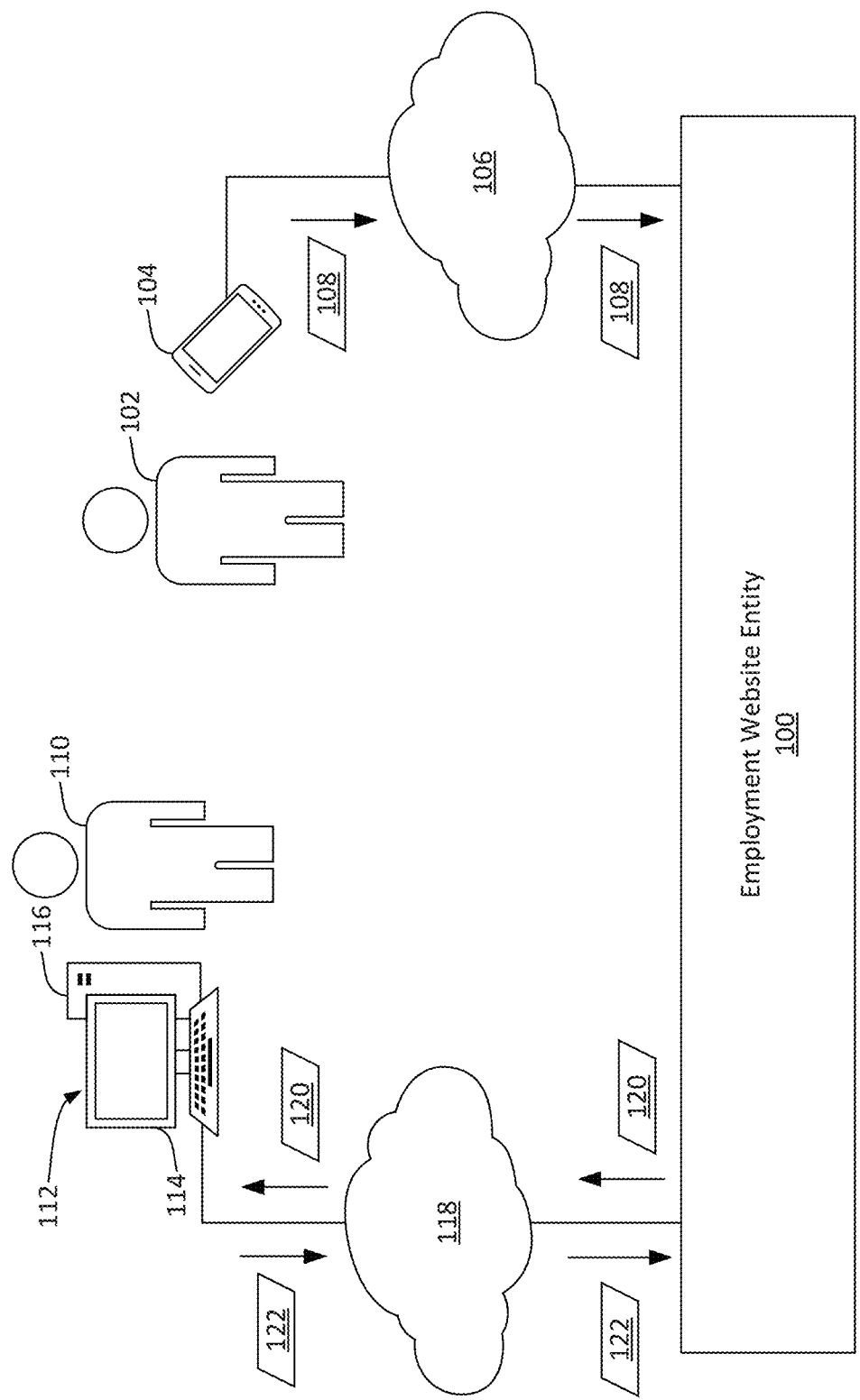
FIG. 1 illustrates an example environment in which an employment website entity presents an automated interface with interactive keywords between an employment posting and candidate profiles.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

The example methods and apparatus disclosed herein include an employment website and/or app for a recruiter that (i) sorts through and filters large amounts of candidate data (e.g., thousands of resumes and profiles) in real-time based on an identified employment posting and (ii) simultaneously presents the employment posting and a corresponding list of qualified candidates in a side-by-side manner to facilitate the recruiter in intuitively identifying candidates of interest. Examples disclosed herein include improved user interfaces for computing devices that are particularly structured to interactively link keywords of the employment posting to one or more candidates within the list of qualified candidates to facilitate the recruiter in understanding the relationships between (i) the keywords of the employment posting, (ii) the list of qualified candidates and (iii) search-terms that are generated based on the keywords to identify the list of qualified candidates.

More specifically, example interfaces disclosed herein include typographically-emphasized keywords (e.g., color coded, highlighted, bolded, italicized, underlined, etc.) within the employment posting that correspond with the search-terms utilized to identify the list of qualified candidates. When the recruiter selects one or more of the typographically-emphasized keywords, the example interfaces disclosed herein simultaneously adjust which of the candidates are presented within the list of qualified candidates next to the employment posting to facilitate the recruiter in understanding which candidates correspond with the selected keywords of the employment posting. Additionally or alternatively, example interfaces disclosed herein simultaneously highlight one or more keywords within the employment posting, when the recruiter selects one of the candidates listed next to the employment posting, to facilitate the recruiter in understanding based on which keywords the selected candidate was included in the list of qualified candidates.

By analyzing large amounts of candidate data in real-time and simultaneously presenting and interactively linking an employment posting and a list of candidates, the example interfaces disclosed herein enable a recruiter to quickly identify candidate(s) of particular interest. Thus, the examples disclosed herein include a specific set of rules that provide an unconventional technological solution of simultaneously presenting and interactively connecting an employment posting and a corresponding list of candidates identified in real-time to a technological problem of uninformative, computer-generated candidate lists for employment postings within an employment website and/or app.

As used herein, an "employment web site entity" refers to an entity that operates and/or owns an employment web site and/or an employment app. As used herein, an "employment website" refers to a website and/or any other online service that facilitates job placement, career, and/or hiring searches. Example employment websites include CareerBuilder.com®, Sologig.com®, etc. As used herein, an "employment app" and an "employment application" refer to a process of an employment website entity that is executed on a desktop computer, on a mobile device, and/or within an Internet browser of a candidate and/or a recruiter. For example, an employment application includes a desktop application that is configured to operate on a desktop computer, a mobile app that is configured to operate on a mobile device (e.g., a smart phone, a smart watch, a wearable, a tablet, etc.), and/or a web application that is configured to operate within an Internet browser (e.g., a mobile-friendly website configured to be presented via a touchscreen of a mobile device).

As used herein, a "candidate" and a "job seeker" refer to a person who is searching for a job, position, and/or career. As used herein, a "recruiter" refers to a person and/or entity (e.g., a company, a corporation, etc.) that solicits one or more candidates to apply for a position and/or a job. For example, a recruiter may include an employer, an employee and/or other representative (e.g., a human resources representative, etc.) of an employer, and/or third-party headhunter.

As used herein, "real-time" refers to a time period that is simultaneous to and/or immediately after a candidate and/or a recruiter enters input information into an employment website and/or app. For example, real-time includes a time duration after a session of a candidate with an employment website and/or app starts and before the session of the candidate with the employment website and/or app ends. As used herein, a "session" refers to an interaction between a candidate and/or recruiter and an employment website and/or app. Typically, a session will be relatively continuous from a start point to an end point. For example, a session may begin when the candidate and/or recruiter opens and/or logs onto the employment website and/or app and may end when the candidate and/or recruiter closes and/or logs off of the employment website and/or app.

As used herein, to "typographically emphasize" refers to modifying presentation of one or more words within a block of text to cause those word(s) to stand out relative to other words within the block of text. Examples of typographical emphasizing words(s) within a block of text include utilizing a different font style, a different typographical size, a different typographical color, a different letter-spacing, punctuation marks, highlighting, underlining, bolding, all-caps, etc. for the typographical-emphasized words(s) relative within the text. As used herein, to "highlight" refers to adjusting a background color for one or more words within text to cause those word(s) to stand out relative to other words within the block of text.

Turning to the figures, FIG. 1 illustrates an example employment website entity 100 (e.g., CareerBuilder.com®) that enables the collection of profile information, resume(s), and/or other information from a candidate 102 via an employment website and/or app. For example, a computing device 104 (e.g., a computer, a desktop, a laptop, a mobile device, a tablet, etc.) of the candidate 102 includes input device(s) (e.g., a touchscreen, a keyboard, a mouse, a button, a microphone, etc.) that enable the candidate 102 to input information for the employment website and/or app via the computing device 104. Further, the employment website entity 100 enables the presentation of employment opportunities and/or other information to the candidate via the employment website and/or app. For example, the computing device 104 includes a display (e.g., a touchscreen, a non-touch display, etc.) that presents interface(s) of the employment website and/or app to the candidate 102. Additionally or alternatively, employment website entity 100 enables the submission of application(s) for the candidate 102 via the employment website and/or app.

As illustrated in FIG. 1, the computing device 104 of the candidate 102 and one or more processor(s) of the employment website entity 100 (e.g., one or more processors 302 of FIG. 3) are in communication with each other via a network 106 (e.g., via a wired and/or a wireless connection). The network 106 may be a public network, such as the Internet; a private network, such as an intranet; or combinations thereof. In the illustrated example, the processor(s) of the employment website entity 100 collect candidate data 108 (e.g., contact information, employment history, skills, a resume, etc.) that the candidate 102 provides via the employment website and/or app.

Additionally, the employment website entity 100 of the illustrated example enables presentation of potential candidates, candidate information, and/or other information to a recruiter 110 via an employment website and/or app 112. For example, a display 114 (e.g., a touchscreen, a non-touch display, etc.) of a computing device 116 (e.g., a computer, a desktop, a laptop, a mobile device, a tablet, etc.) presents interface(s) of the employment website and/or app 112 to the recruiter 110. Further, the employment website entity 100 of the illustrated example enables collection of employment postings, employer preferences, and/or other information from the recruiter 110 via the employment web site and/or app 112. For example, the computing device 116 include input device(s) (e.g., a touchscreen, a keyboard, a mouse, a button, a microphone, etc.) that enable the recruiter 110 to input information for the employment website and/or app 112 via the computing device 116.

As illustrated in FIG. 1, the computing device 116 of the recruiter 110 and the processor(s) of the employment website entity 100 are in communication (e.g., via a wired and/or a wireless connection) with each other via a network 118. The network 118 may be a public network, such as the Internet; a private network, such as an intranet; or combinations thereof. In the illustrated example, the network 118 is separate from the network 106. In other examples, the network 118 and the network 106 are integrally formed. Further, in the illustrated example, the processor(s) of the employment website entity 100 sends app data 120 (e.g., interfaces of the employment web site and/or app 112, candidate information, etc.) that are presented to the recruiter 110 via the display 114 of the computing device 116. Further, the processor(s) of the employment website entity 100 collect recruiter data 122 (e.g., employment postings, user selections, etc.) that the recruiter 110 provides via the employment website and/or app 112.

Figure 2:
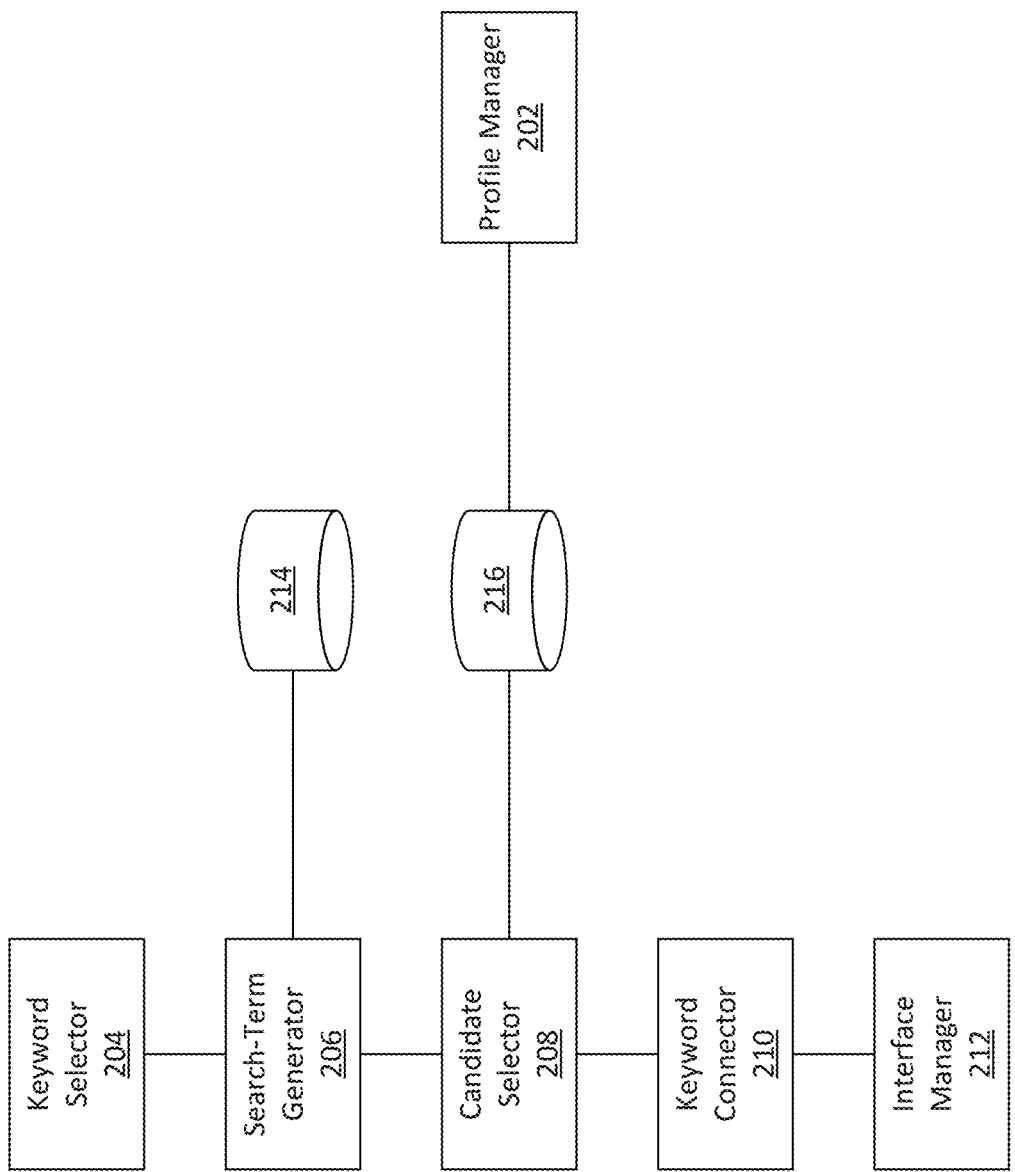
FIG. 2 is a block diagram of components of the employment website entity of FIG. 1 for presents an automated interface with interactive keywords between an employment posting and candidate profiles.

FIG. 2 is a block diagram of components of one or more processors (e.g., one or more processors 302 of FIG. 3) of the employment website entity 100 for simultaneously presenting and interactively connecting an employment posting and a corresponding list of candidates identified in real-time. As illustrated in FIG. 2, the components of the employment website entity 100 include a profile manager 202, a keyword selector 204, a search-term generator 206, a candidate selector 208, a keyword connector 210, an interface manager 212, a search-term database 214, and a profile database 216.

In operation, the profile manager 202 is configured to collect resumes, profile information, and/or other information that candidates (e.g., the candidate 102) have submitted to the employment website entity 100 via an employment website and/or app. For example, the profile manager 202 is configured to collect the candidate information via the network 106. Further, the profile manager 202 is configured to generate candidate profiles based on the candidate information collected from the candidates. For example, the profile manager 202 is configured to generate candidate profiles based on, at least in part, resumes of the candidates that were collected via the employment website and/or app. Further, the profile manager 202 is configured to store the candidate profiles within the profile database 216. That is, the profile database 216 is configured to store the candidate profiles of the candidates. In the illustrated example, the profile manager 202 also is configured to extract the text of the documents (e.g., resumes) submitted by the candidates to the employment website entity 100. Further, the profile manager 202 is configured to parse the extracted text to identify keywords within the documents (e.g., resumes) submitted by the candidates. For example, a keyword is word or phrase included within the text of the document that at least partially represents the content of the document. In such examples in which the profile manager 202 identifies keywords within the candidate documents, the profile database 216 is configured to store the identified keywords to facilitate the subsequent identification and retrieval of candidate information from the profile database 216 by the candidate selector 208.

The keyword selector 204 of the illustrated example is configured to extract and parse text of an employment posting in real-time during a session of the recruiter 110 on the employment website and/or app 112. For example, the keyword selector 204 is configured to access an employment posting (e.g., from a website of the employment website entity 100 and/or a third-party entity, from a requisition database of the employment website entity 100 and/or a third-party entity, etc.). In some examples, the keyword selector 204 is configured to access the employment posting via a uniform resource locator (URL) that is received from the recruiter 110 via the employment website and/or app 112. Additionally or alternatively, the keyword selector 204 is configured to access the employment posting via a built-in widget of a browser. Upon accessing the employment posting, the keyword selector 204 is configured to extract the text of the accessed employment posting. Further, the keyword selector 204 is configured to parse the extracted text to identify keywords within the employment posting. For example, a keyword is word or phrase included within the text of the employment posting that at least partially represents the content of the employment posting.

Further, in some examples, the keyword selector 204 is configured to identify one or more keywords based on input provided by the recruiter 110 via the employment web site and/or app 112. For example, the keyword selector 204 is configured to detect when the recruiter 110 has performed a freeform selection of a word or phrase within the employment posting. In response to detecting the freeform selection, the keyword selector 204 identifying the selected word or phrase and automatically converts the selected word or phrase into another keyword.

As used herein, a "freeform selection" refers to a selection of an unspecified word or phrase that causes corresponding predefined function(s) to be performed. For example, an unspecified word or phrase may not be typographically-emphasized within a block of text. An example of a freeform selection includes a user selecting (e.g., clicking, tapping, etc.) on and/or next to a word or phrase and subsequently dragging over the word or phrase. Portion(s) of the word or phrase may temporarily become highlighted as the user performs the freeform selection to indicate to the user that the freeform selection is being performed. An example predefined function may include generating a structured selection for the word or phrase specified by the user.

As used herein, a "structured selection" refers to a selection of a pre-specified word or phrase that causes corresponding predefined function(s) to be performed. For example, a pre-specified word or phrase may be typographically-emphasized within a block of text to illustrate to a user that a structured selection of the pre-specified word or phrase will cause predefined function(s) to be performed. An example performance of a structured selection includes a user selecting (e.g., clicking, tapping, hovering over, etc.) a pre-specified word or phrase that have been typographically emphasized within a block of text. Example predefined function(s) may include highlighting candidate(s) within a list of candidates, highlighting keyword(s) within a block of text, hiding candidate(s) within a list of candidates, etc.

In the illustrated example, the search-term generator 206 is configured to generate search-terms based on the keywords identified by the keyword selector 204. For example, the search-term generator 206 is configured to retrieve one or more search-terms (e.g., "5-10 years of experience," "more than 10 years of experience," "at least 5 years of experience," etc.) from the search-term database 214 that correspond with the keywords (e.g., "at least 5 years of experience") of the employment posting identified by the keyword selector 204. The search-term database 214 of the illustrated example is configured to store keywords, search-terms, and associations between the keywords and the search-terms to enable the search-term generator 206 to retrieve search-terms based on previously-identified keywords. In the illustrated example, the employment website entity 100 includes and/or operates the search-term database 214. In other examples, a third-party entity includes and/or operates the search-term database 214, and the search-term generator 206 of the employment website entity 100 accesses the search-term database 214 of the third-party entity to retrieve the search-terms. Further, the search-term generator 206 is configured to identify the search-terms based on the keywords to improve and/or increase a quality and/or relevancy of candidates subsequently identified for the employment posting.

As used herein, a "keyword" refers to a word or phrase included within a document (e.g., an employment posting, etc.) that represents at least a portion of the content of the document. As used herein, a "search-term" refers to one or more phrases related to a keyword (e.g., the keyword itself, synonyms of the keyword, etc.) that are utilized to precisely and accurately identify other information (e.g., candidates, candidate profiles, etc.) related to a document (e.g., an employment posting, etc.) that includes the keyword.

Further, in some examples, the search-term generator 206 is configured to receive one or more from the recruiter 110 via the employment website and/or app 112. For example, the search-term generator 206 is configured to receive one or more additional search-terms from the recruiter 110 via a textbox of an interface of the employment website and/or app 112.

The candidate selector 208 of the illustrated example is configured to retrieve one or more of the candidate profiles from the profile database 216 based on the search-term(s) identified by the search-term generator 206. For example, the candidate selector 208 identifies the candidate profiles based on the search-term(s) identified by the search-term generator 206 to increase the relevancy of the identified candidates for the employment posting. In the illustrated example, the employment website entity 100 includes and/or operates the profile database 216. In other examples, a third-party entity includes and/or operates the profile database 216 (e.g., according to a job title taxonomy such as Occupational Information Network (ONET); European Skills/Competences, Qualifications and Occupations (ESCO); etc.), and the candidate selector 208 of the employment website entity 100 accesses the profile database 216 of the third-party entity to retrieve the search-terms.

Further, the candidate selector 208 is configured to generate a list of candidates based on the candidate profile(s) retrieved from the profile database 216. For example, the candidate selector 208 ranks the candidates based on the relevancy of the candidate profiles to the search-terms that are associated with the employment posting. That is, the candidate selector 208 is configured to determine a high ranking for a candidate whose candidate profile closely matches the search-terms of the employment posting (e.g., based on the previously-identified keywords of the candidate profile). Further, the candidate selector 208 is configured to determine a low ranking for a candidate whose candidate profile loosely matches and/or does not match the search-terms of the employment posting (e.g., based on the previously-identified keywords of the candidate profile). In some examples, the candidate selector 208 is configured to limit the number of candidates included in the ranked list of candidates. For example, the candidate selector 208 is configured to include a predetermined number of the highest ranked candidates in the list of candidates.

Additionally or alternatively, the candidate selector 208 is configured to dynamically adjust, in real-time, the candidates included in the list of candidates in response to the recruiter 110 adding and/or removing one or more search-term(s). For example, the candidate selector 208 is configured to dynamically adjust the list of candidates when the recruiter 110 adds one or more search-terms via a textbox and/or a freeform selection.

In the illustrated example, the keyword connector 210 is configured to operatively connect the keywords of the employment posting with the search-terms utilized by the candidate selector 208 to generate the list of candidates associated with the employment posting. Further, the keyword connector 210 is configured to operatively connect the keywords and/or the search-terms of the employment posting with the candidates, the candidate profiles of those candidates, and/or the keywords of those candidate profiles included in the list of candidates. For example, the keyword connector 210 operatively connects these keywords, search-terms, candidates, and/or candidate profiles to facilitate the recruiter 110 in quickly identifying which candidates are of interest for the employment posting.

The interface manager 212 is configured to generate and present an interface (e.g., an interface 600 of FIGS. 6-20) of the employment website and/or app 112 to the recruiter 110 via the display 114 of the computing device 116. The interface includes a posting section and a candidate section adjacent to each other. For example, interface manager 212 is configured to arrange the posting section and the candidate section in a side-by-side manner within the interface of the employment website and/or app 112. The interface manager 212 is configured to include (i) the text of the employment posting within the posting section and (ii) the list of candidates within the candidate section to enable the recruiter 110 to simultaneously view the text of the employment posting and those candidates identified by the candidate selector 208 as potentially being qualified for the employment posting.

In the illustrated example, the interface manager 212 also is configured to typographically emphasize the keywords of the employment posting within the posting section of the interface to indicate relationships between the employment posting and the list of candidates to the recruiter 110. For example, the interface manager 212 also is configured to modify a typographical color of the keywords within the posting section of the interface to facilitate the recruiter 110 in identifying why candidates are included within the list of candidates (by the candidate selector 208) for the employment posting. Further, in some examples, the interface manager 212 is configured to color code the typographically-emphasized keywords to further facilitate the recruiter 110 in identifying why candidates are included within the list of candidates. For example, the interface manager 212 is configured to utilize a first typographical color (e.g., green) for a first type of keywords (e.g., job titles), a second typographical color (e.g., blue) for a second type of keywords (e.g., skills), etc.

The interface manager 212 of the illustrated example also is configured to enable the recruiter 110 to interact with the posting section and the candidate section of the interface to further facilitate the recruiter 110 in identifying the relationships between the employment posting within the posting section and the list of candidates within the candidate section. For example, the interface manager 212 is configured to enable the recruiter 110 to perform a structured selection of a keyword and/or a candidate included in the interface of the employment website and/or app 112. In some examples, the interface manager 212 is configured to generate a structured selection for each of the keywords included in the posting section of the interface. In such examples, the interface manager 212 is configured to determine when the recruiter 110 is performing a structured selection of one of the keywords within the employment posting.

For example, while detecting that the recruiter 110 is performing a structured selection (e.g., hovering over, clicking, tapping) of one of the keywords, the interface manager 212 is configured to temporarily highlight (1) the selected keyword and (2) one or more candidates within the list of candidates that correspond with the selected keyword. That is, the interface manager 212 is configured to temporarily highlight a candidate within the list of candidates if the candidate profile of that candidate includes content that matches and/or otherwise corresponds with the selected keyword.

Additionally or alternatively, in response to detecting that the recruiter 110 has pinned one of the keywords by performing a structured selection (e.g., hovering over, clicking, tapping), the interface manager 212 is configured to (1) fixedly highlight the selected keyword and (2) dynamically hide, in real-time, one or more candidates within the list of candidates that do not correspond with the pinned keyword. As used herein, to "pin" refers to fixedly set a word or phrase in a selected state. For example, a word or phrase may be pinned responsive to a user (e.g., a recruiter) performing a structured selection of the word or phrase and subsequently performing a structured selection of a "pin" button designated for the word or phrase. A pinned word or phrase may remain in the selected state until the user performs a structured selection of an "unpin" button to unpin or deselect the word or phrase.

In some examples, the interface manager 212 is configured to include a "radar" button in the interface of the employment web site and/or app 112. In response to detecting that the recruiter 110 has performed a structured selection of the radar button (e.g., a radar button 2002 of FIG. 20), the interface manager 212 is configured to present a portion of a candidate profile of each of the candidates within the list of candidates presented in the candidate section of the interface. In some such examples, the interface manager 212 is configured to determine when the recruiter 110 is performing a structured selection of one of the keywords of the employment posting within the employment section. While detecting that the recruiter 110 is performing a structured selection (e.g., hovering over, clicking, tapping) of one of the keywords, the interface manager 212 is configured to temporarily highlight (1) the selected keyword within the posting section and (2) any keyword(s) within the candidates profiles that correspond with the selected keyword to facilitate the recruiter 110 in identifying relationships between the selected keyword and the candidate profiles.

Further, in some examples, while detecting that the recruiter 110 is performing a structured selection (e.g., hovering over, clicking, tapping) of a candidate within the list of candidates presented in the candidate section of the interface, the interface manager 212 is configured to temporarily highlight (1) the selected candidate and (2) one or more keywords within the employment posting that correspond with the selected candidate. That is, the interface manager 212 is configured to temporarily highlight keyword(s) within the employment posting if the candidate profile of the selected candidate includes content that matches those keyword(s). Additionally or alternatively, the interface manager 212 is configured to present an expanded candidate summary within the candidate section of the interface in response to determining that the recruiter 110 has performed a structured selection of a corresponding candidate name within the list of candidates in the candidate section.

In the illustrated example, the components of the processor(s) of the employment website entity 100 are configured to simultaneously present and interactively connect an employment posting and a corresponding list of candidates for the recruiter 110. Additionally or alternatively, the components of the processor(s) of the employment website entity 100 are configured to simultaneously present and interactively connect a resume (also referred to as a CV) of the candidate 102 and a corresponding list of potential employment opportunities for the candidate 102.

For example, a posting manager of the processor(s) is configured to collect job postings submitted by employers to the employment website entity 100 via an employment website and/or app. The posting manager also is configured to store the job postings within a posting database. Further, the posting manager is configured to extract text of the job postings, parse the extracted text to identify keywords within the job postings, and store the identified keywords to facilitate the subsequent identification and retrieval of job postings from the posting database. In such examples, the keyword selector 204 is configured to extract and parse text of a resume of the candidate 102 to identify keywords within the resume in real-time during a session of the candidate 102 on the employment website and/or app 112. In some such examples, the keyword selector 204 is configured to identify one or more keywords based on input provided by the candidate 102 via the employment website and/or app 112 (via a textbox and/or a freeform selection). The search-term generator 206 is configured to generate search-terms by accessing the search-term database 214 based on the keywords identified by the keyword selector 204. In some such examples, the search-term generator 206 is configured to receive one or more from the candidate 102 via the employment website and/or app 112 (e.g., via a textbox).

Further, a posting selector of the processor(s) in such examples is configured to retrieve one or more job postings from the posting database based on the search-term(s) identified by the search-term generator 206. For example, the posting selector identifies the job postings based on the search-term(s) identified by the search-term generator 206 to increase the relevancy of the identified job postings for the candidate 102. The posting selector also is configured to generate a list of postings based on the job postings retrieved from the posting database. For example, the posting selector ranks the job postings based on the relevancy of the job postings to the search-terms that are associated with the resume of the candidate 102. Additionally or alternatively, the posting selector is configured to dynamically adjust, in real-time, one or more of the job postings included in the list of postings in response to the candidate 102 adding and/or removing one or more search-term(s). The keyword connector 210 is configured to operatively connect the keywords of the resume of the candidate 102 with the search-terms utilized by the posting selector to generate the list of postings associated with the resume. Further, the keyword connector 210 is configured to operatively connect the keywords and/or the search-terms of the resume with the job postings, summaries of those job postings, and/or the keywords of those job postings to facilitate the candidate 102 in quickly identifying which job postings are of interest.

The interface manager 212 of such examples is configured to generate and present an interface of the employment web site and/or app 112 to the candidate 102 via the computing device 104. The interface includes a resume section and a posting section adjacent to each other (e.g., in a side-by-side manner). The interface manager 212 is configured to include (i) the text of the resume within the resume section and (ii) the list of job postings within the posting section to enable the candidate 102 to simultaneously view the text of his or her resume and those job postings identified by the posting selector as potentially being of interest to the candidate 102. Additionally or alternatively, in response to detecting that the candidate 102 has pinned one of the keywords of the resume, the interface manager 212 is configured to (1) fixedly highlight the selected keyword and (2) dynamically hide, in real-time, one or more job postings within the list of postings that do not correspond with the pinned keyword. Further, in some such examples, while detecting that the candidate 102 is performing a structured selection (e.g., hovering over, clicking, tapping) of a posting within the list of postings presented in the posting section of the interface, the interface manager 212 is configured to temporarily highlight (1) the selected posting and (2) one or more keywords within the resume of the candidate 102 that correspond with the selected posting.

Figure 3:
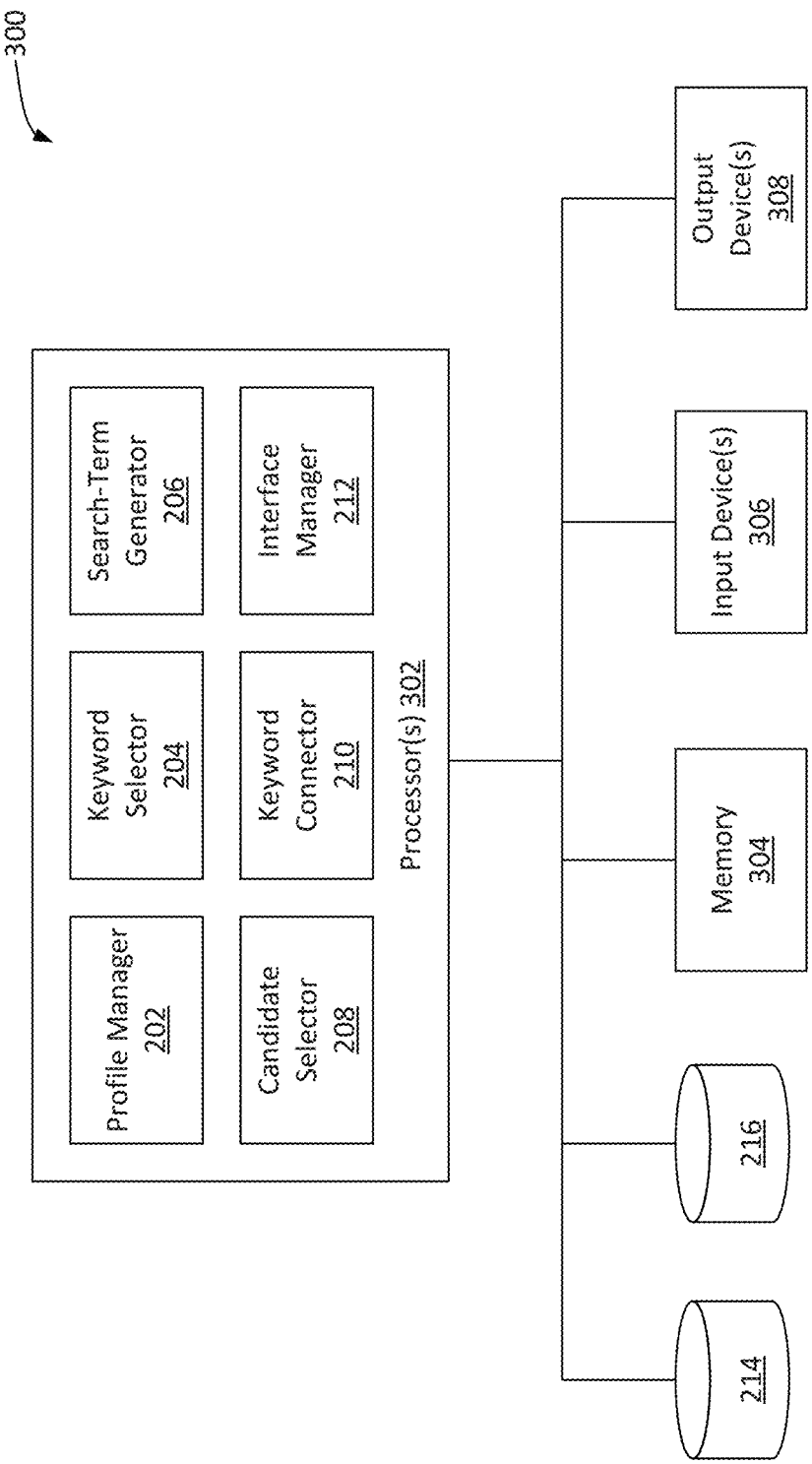
FIG. 3 is a block diagram of electronic components of the employment web site entity of FIG. 1.

FIG. 3 is a block diagram of electronic components 300 of the employment website entity 100. As illustrated in FIG. 3, the electronic components 300 include one or more processors 302 (also referred to as microcontroller unit(s) and controller(s)). Further, the electronic components 200 include the search-term database 214, the profile database 216, memory 304, input device(s) 306, and output device(s) 308. In the illustrated example, each of the search-term database 214 and the profile database 216 is a separate database. In other examples, the search-term database 214 and the profile database 216 are integrally formed.

In the illustrated example, the processor(s) 302 are structured to include the profile manager 202, the keyword selector 204, the search-term generator 206, the candidate selector 208, the keyword connector 210, and the interface manager 212. The processor(s) 302 of the illustrated example include any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). Further, the memory 304 is, for example, volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 304 includes multiple kinds of memory, such as volatile memory and non-volatile memory.

The memory 304 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 304, the computer readable medium, and/or within the processor(s) 302 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

In the illustrated example, the input device(s) 306 enable a user, such as an information technician of the employment website entity 100, to provide instructions, commands, and/or data to the processor(s) 302. Examples of the input device(s) 306 include one or more of a button, a control knob, an instrument panel, a touch screen, a touchpad, a keyboard, a mouse, a speech recognition system, etc.

The output device(s) 308 of the illustrated example display output information and/or data of the processor(s) 302 to a user, such as an information technician of the employment website entity 100. Examples of the output device(s) 308 include a liquid crystal display (LCD), an organic light emitting diode (OLED) display, a flat panel display, a solid state display, and/or any other device that visually presents information to a user. Additionally or alternatively, the output device(s) 308 may include one or more speakers and/or any other device(s) that provide audio signals for a user. Further, the output device(s) 308 may provide other types of output information, such as haptic signals.

FIGS. 4-20 depict example interfaces of the employment website and/or app 112. The example interfaces are configured to be presented via the display 114 of the computing device 116 and/or other displays(s) (e.g., a touchscreen, a non-touch display, etc.) of other computing device(s) (e.g., a desktop, a laptop, a tablet, a mobile device, etc.). For example, the interfaces are particularly structured, individually and in conjunction with each other, to simultaneously present and interactively connect an employment posting and a corresponding list of identified candidates in real-time to facilitate a recruiter in identifying relationships between the employment posting and the list of candidates.

Figure 4:
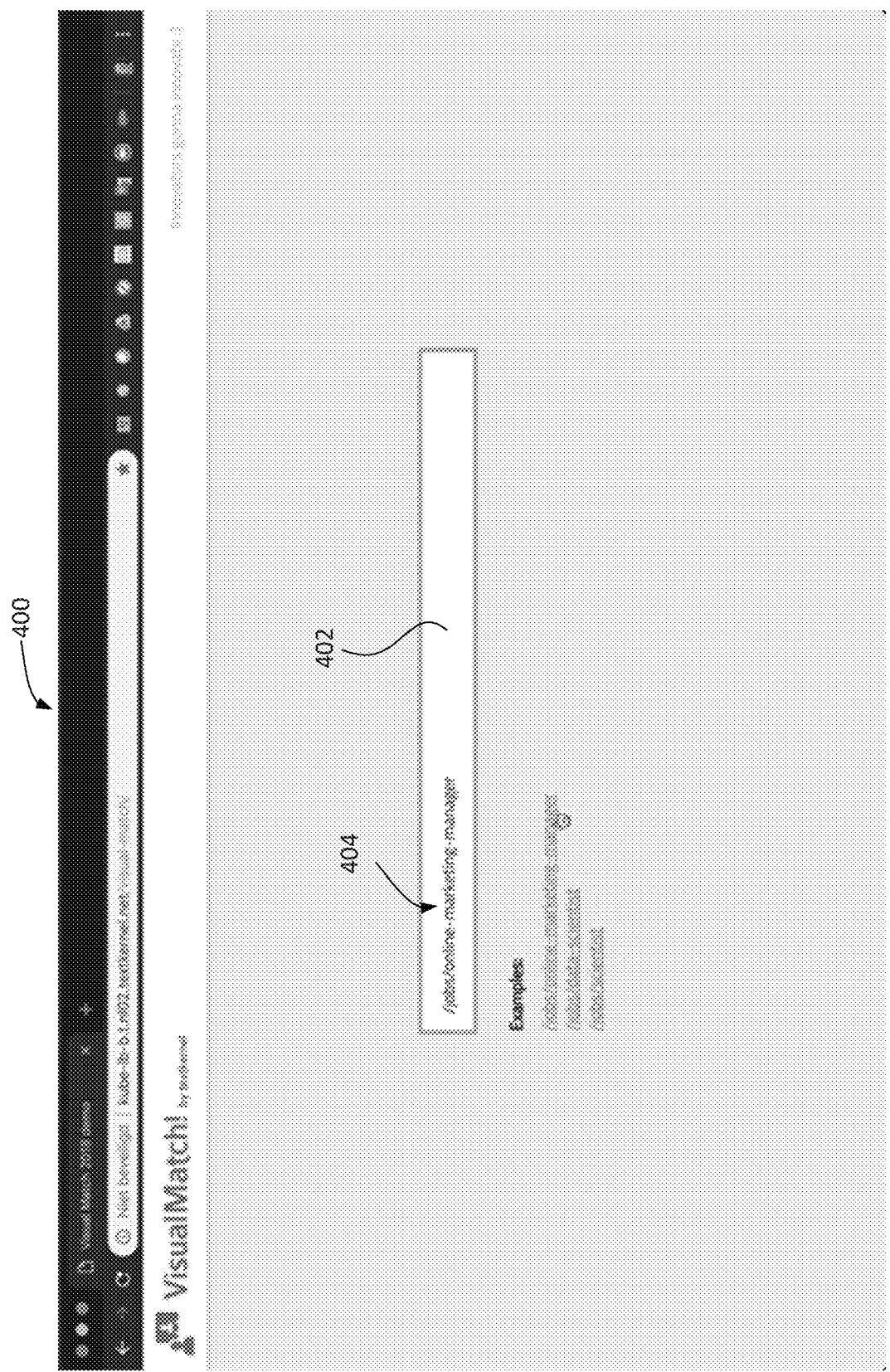
FIG. 4 illustrates an example interface with a link to a job posting.

FIG. 4 illustrates an interface 400 of the employment website and/or app 112. As illustrated in FIG. 4, the interface 400 includes a textbox 402 to receive a uniform resource locator (URL) of an employment posting from the recruiter 110.

Figure 5:
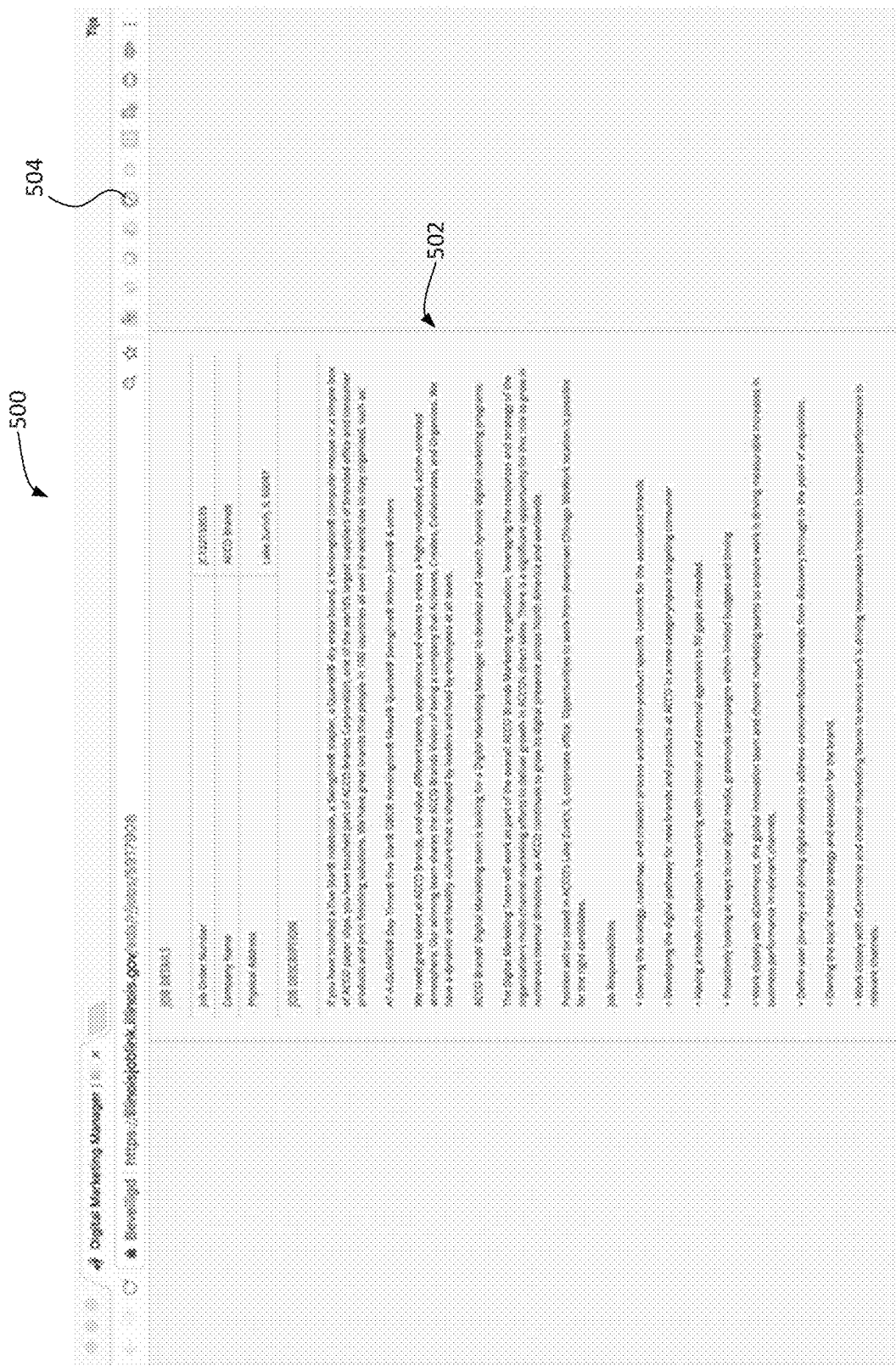
FIG. 5 illustrates an example job posting with a browser widget.

FIG. 5 illustrates another interface 500 within a browser. The interface 500 includes a posting 502 for an employment opportunity. For example, the posting 502 may be included in (i) the employment web site and/or app 112, (ii) a website of a third-party, and/or (iii) a requisition database of the employment web site entity 100 and/or a third-party. A built-in browser widget 504 is also depicted. For example, when the recruiter 110 has the posting 502 open in his or her browser and selects the widget 504, the keyword selector 204 of the employment website entity 100 accesses a link to the posting 502 via the employment web site and/or app 112.

Figure 6:
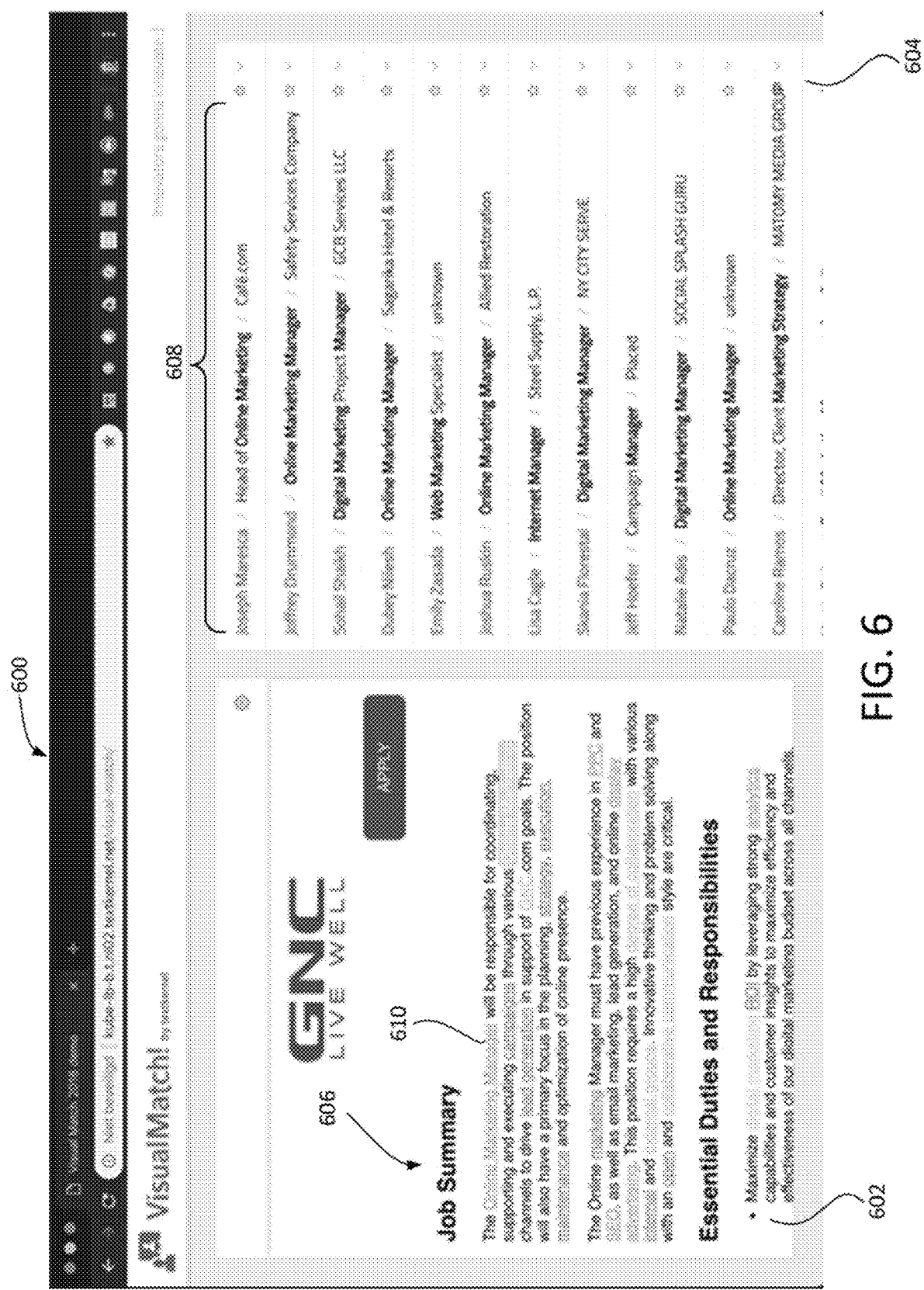
FIG. 6 illustrates an example automated interface with interactive keywords between an employment posting and candidate profiles.

FIG. 6 illustrates an example interface 600 of the employment website and/or app 112 that is configured to facilitate the recruiter 110 in identifying relationships between the posting 502 and potential candidates. As illustrated in FIG. 6, the interface 600 includes a posting section 602 and a candidate section 604. The posting section 602 includes an employment posting 606. For example, the employment posting 606 is an extracted and parsed version (e.g., via the keyword selector 204) of the employment posting 502. Further, the candidate section 604 includes a list of candidates 608 identified by the candidate selector 208 as corresponding with the employment posting 606. The interface manager 212 configures the interface 600 of the illustrated example to be side-by-side to enable the recruiter 110 to simultaneously view the employment posting 606 and the list of candidates 608.

As illustrated in FIG. 6, the interface manager 212 typographically emphasizes the keywords 610 within the employment posting 606 of the interface 600. For example, the keywords 610 in the interface 600 are underlined and their modify a typographical colors are modified with respect to the other text of the employment posting 606. In the illustrated example, the keywords 610 are color coded within the posting section 602 of the interface 600. For example, a first type of the keywords 610 (e.g., job titles) has a first typographical color (e.g., green), a second type of the keywords 610 (e.g., skills) has a second typographical color (e.g., blue), etc.

Figure 7:
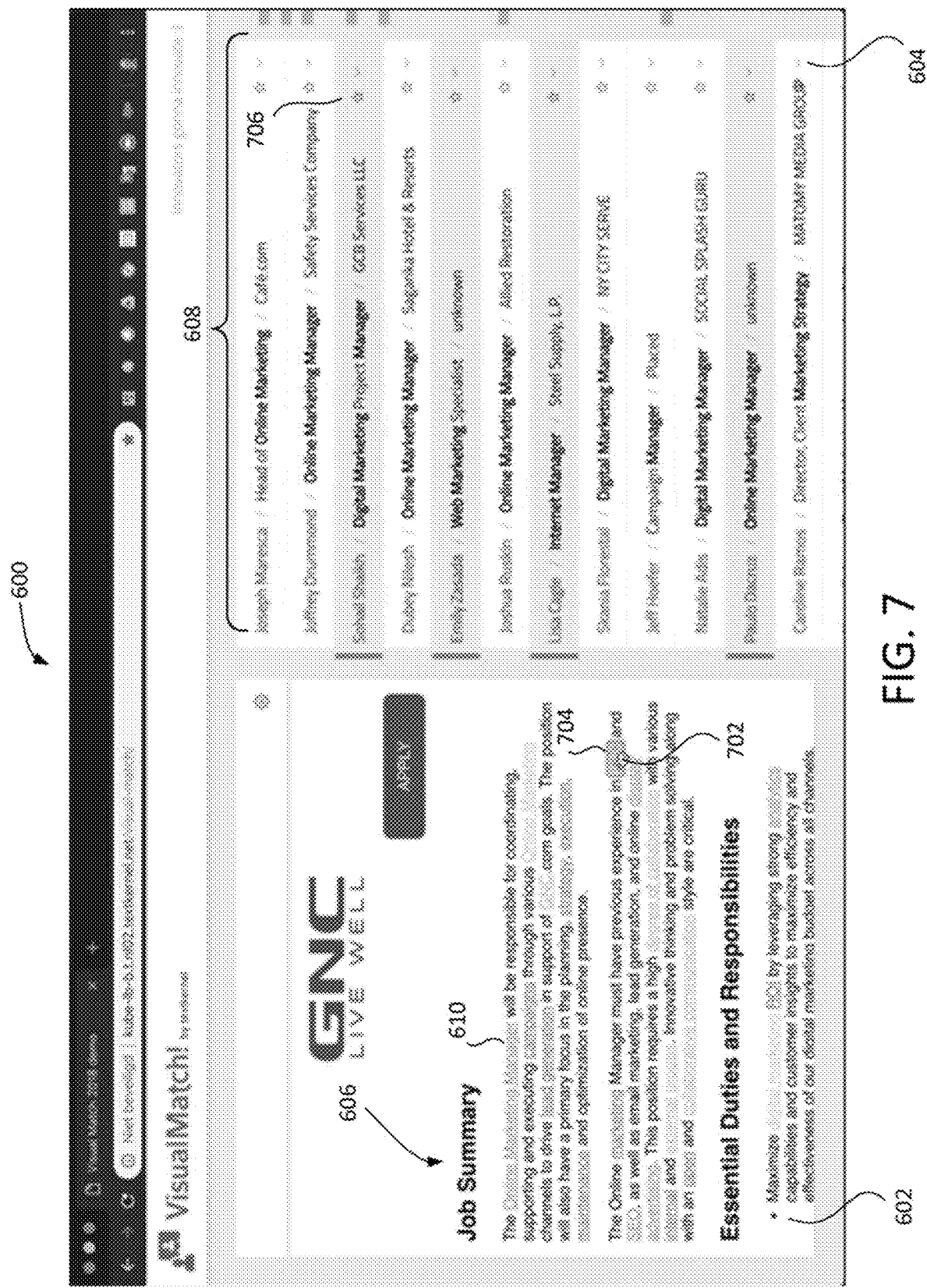
FIG. 7 further illustrates the automated interface of FIG. 6.

FIG. 7 illustrates another state of the interface 600 during which the recruiter 110 is performing a structured selection of one of the keywords 610 by hovering over and/or clicking via a cursor 702. For example, FIG. 7 depicts the interface 600 when the recruiter 110 is performing a structured selection of a selected keyword 704 within the employment posting 606 presented within the posting section 602. When the selected keyword 704 is being selected via a structured selection, the selected keyword 704 is temporarily highlighted within the posting section 602 by the interface manager 212. Further, when the selected keyword 704 is being selected via a structured selection, candidates 706 that are included in the list of candidates 608 and correspond to the selected keyword 704 are temporarily highlighted by the interface manager 212. The selected keyword 704 and the candidates 706 are highlighted to facilitate the recruiter 110 in identifying relationships between the selected keyword 704 and the list of candidates 608. That is, the interface 600 is configured to simultaneously present and interactively connect the keywords 610 of the employment posting 606 and the list of candidates 608 to facilitate the recruiter 110 in identifying relationships between the keywords 610 and the list of candidates 608.

Figure 8:
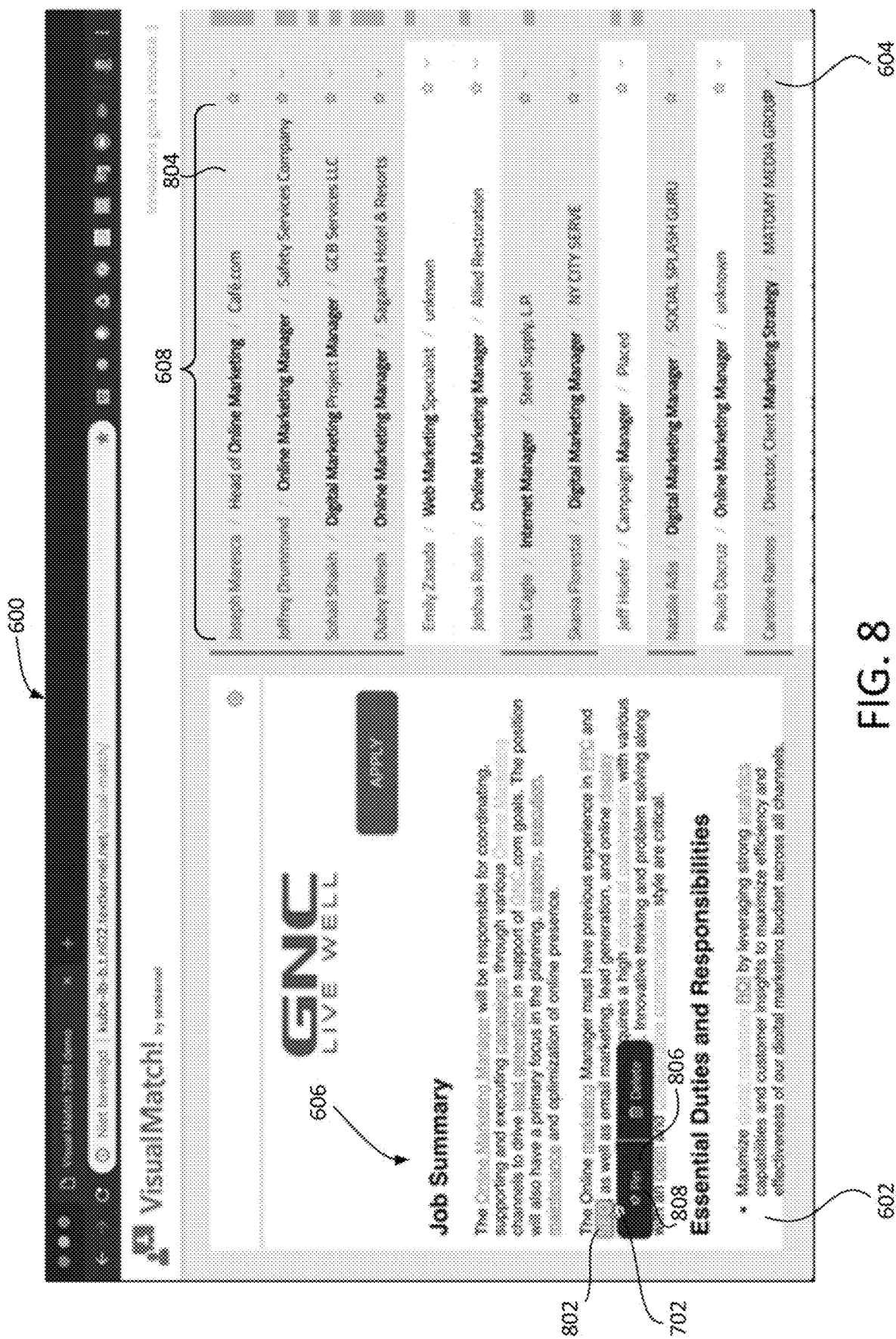
FIG. 8 further illustrates the automated interface of FIG. 6.

FIG. 8 illustrates another state of the interface 600 during which the recruiter 110 is pinning one of the keywords 610 via the cursor 702. For example, to pin one of the keywords 610, the recruiter 110 first performs a structured selection of a selected keyword 802. As disclosed above with respect to FIG. 7, the selected keyword 802 and candidates 804 that correspond with the selected keyword are highlighted to facilitate the recruiter 110 in identifying relationships between the selected keyword 704 and the list of candidates 608. Further, the interface manager 212 includes a popup menu 806 within the interface 600 when the recruiter 110 performs a particular structured selection (e.g., clicking via the cursor 702) of the selected keyword 802. As illustrated in FIG. 8, the popup menu 806 is located over and/or adjacent to the selected keyword 802. Further, the popup menu 806 includes a pin button 808. When the recruiter 110 performs a structured selection of the pin button 808, the interface manager 212 pins the selected keyword 802 to form a pinned keyword.

Figure 9:
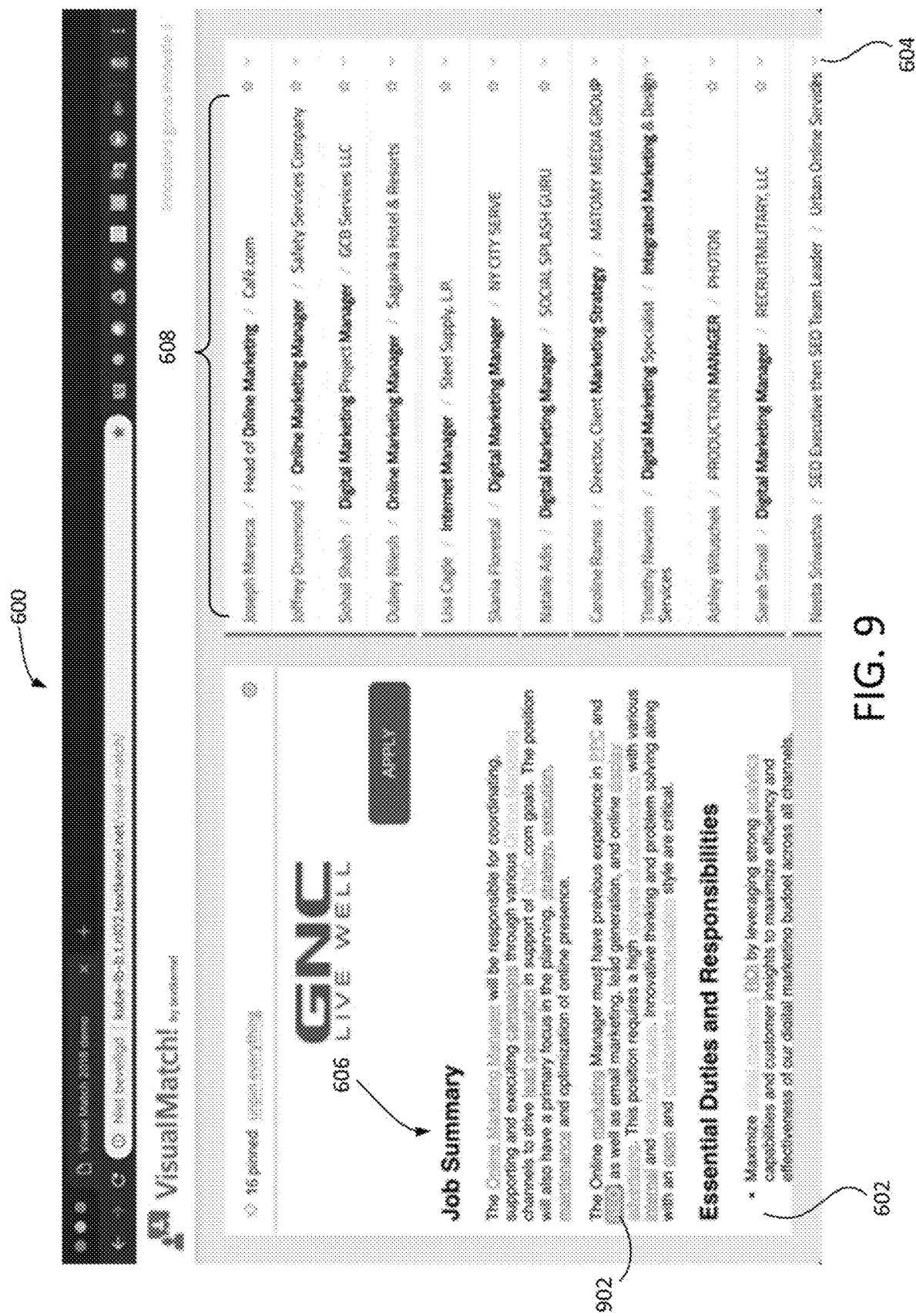
FIG. 9 further illustrates the automated interface of FIG. 6.

FIG. 9 illustrates another state of the interface 600 after the recruiter 110 has pinned the selected keyword 802 within the employment posting 606 of the posting section 602. As illustrated in FIG. 9, the interface manager 212 forms a pinned keyword 902 in response to the recruiter 110 pinning the selected keyword 802. As illustrated in FIG. 9, the pinned keyword 902 is fixedly highlighted by the interface manager 212 to facilitate identification by the recruiter 110. Further, in response to the recruiter 110 pinning the pinned keyword 902, the interface manager 212 dynamically hides, in real-time, one or more candidates of the list of candidates 608 that do not correspond with the pinned keyword 902. That is, the interface manager 212 hides those candidates that do not correspond with the pinned keyword 902 to facilitate the recruiter in identifying those candidates that do correspond with the pinned keyword 902.

Figure 10:
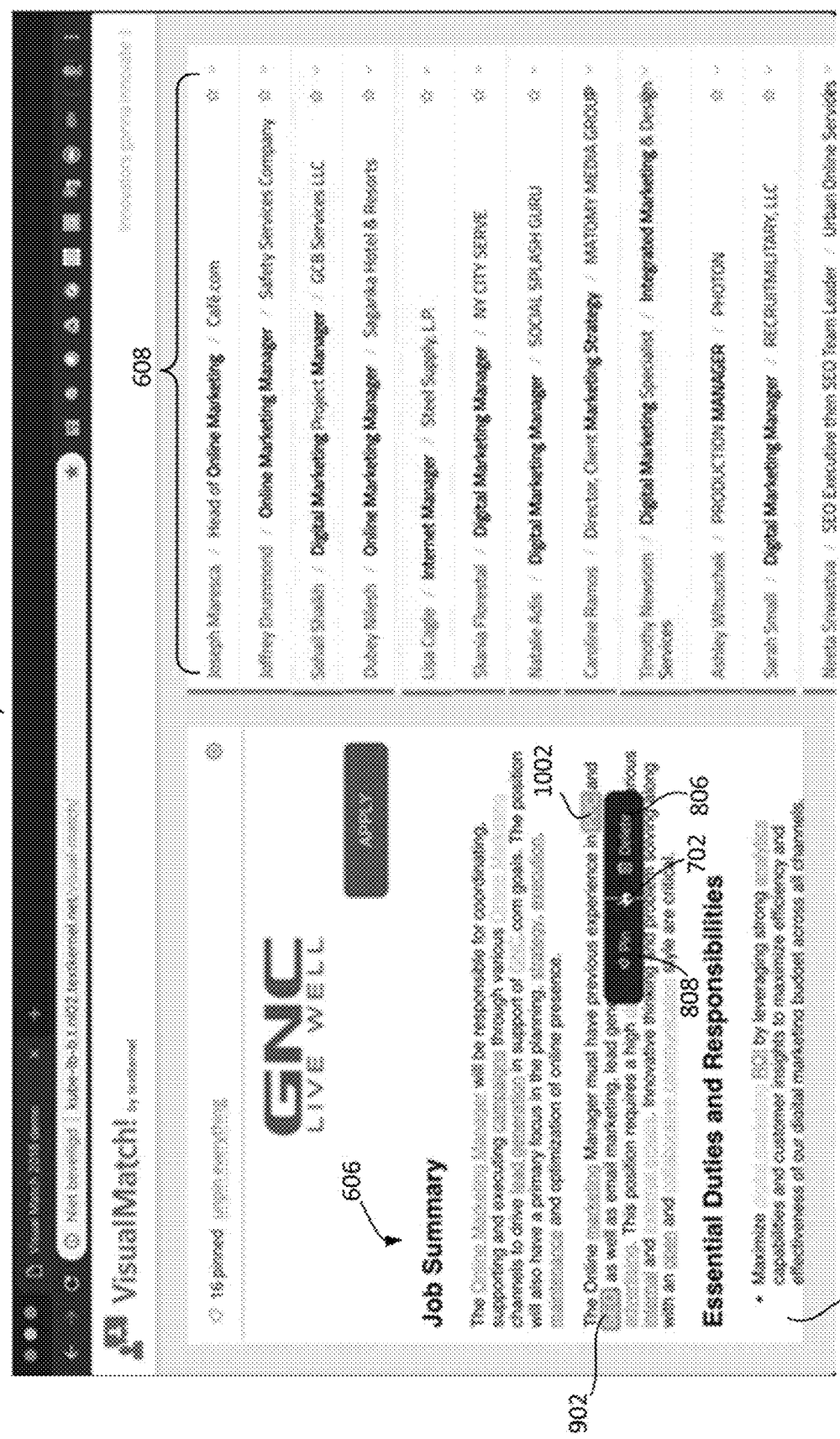
FIG. 10 further illustrates the automated interface of FIG. 6.

FIG. 10 illustrates another state of the interface 600 during which the recruiter 110 is pinning another one of the keywords 610, in addition to the pinned keyword 902, via the cursor 702. For example, FIG. 10 depicts the interface 600 when the recruiter 110 has performed a particular structured selection (e.g., clicking via the cursor 702) of a selected keyword 1002. The interface 600 includes the popup menu 806 in response to the recruiter 110 performing the structured selection. When the recruiter 110 performs a structured selection of the pin button 808, the interface manager 212 pins the selected keyword 1002 to form a pinned keyword.

Figure 11:
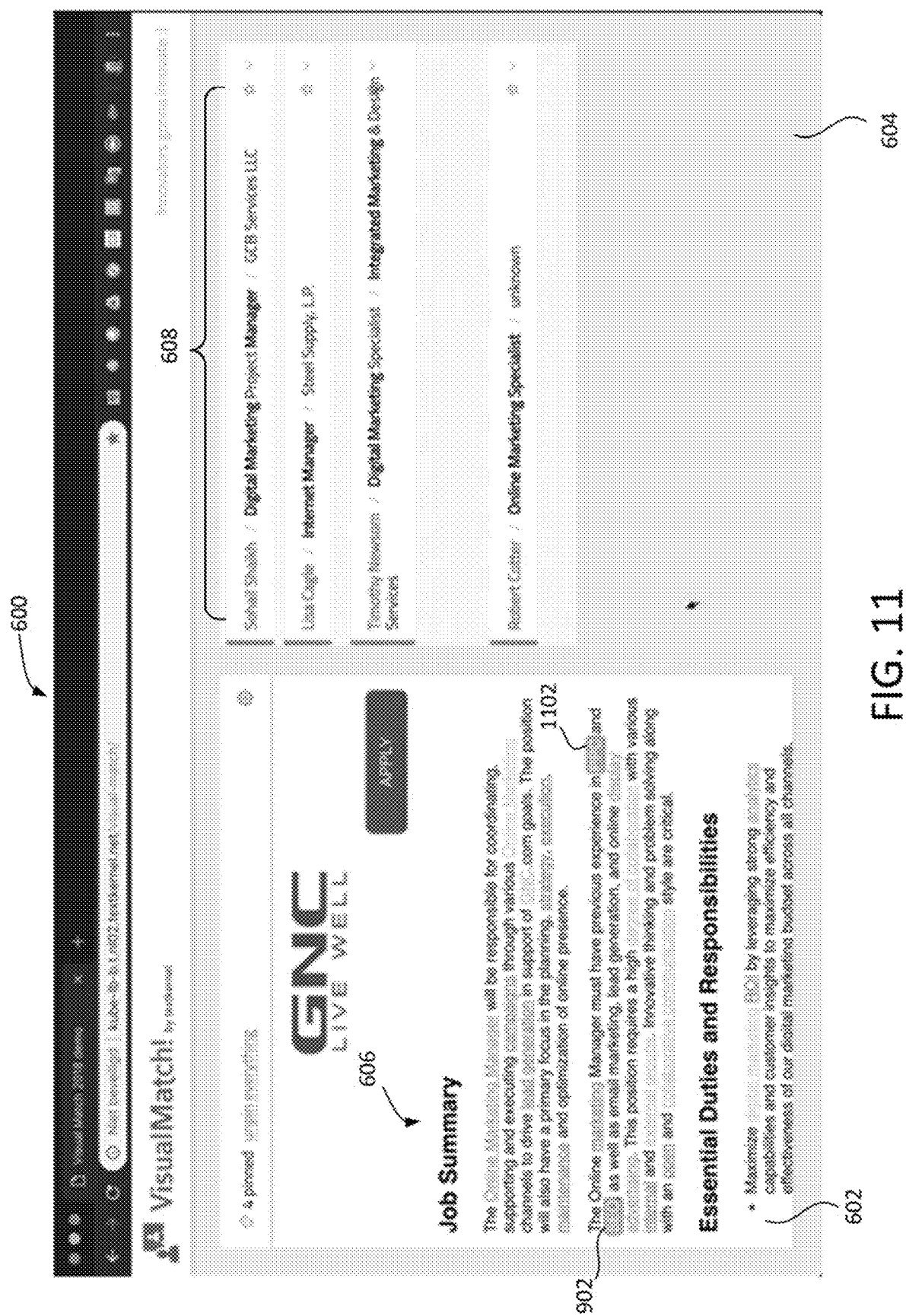
FIG. 11 further illustrates the automated interface of FIG. 6.

FIG. 11 illustrates another state of the interface 600 after the recruiter 110 has pinned the selected keyword 802 within the employment posting 606 of the posting section 602. The interface manager 212 forms a pinned keyword 1102 in response to the recruiter 110 pinning the selected keyword 1002. In the illustrated example, the posting section includes the pinned keyword 902 and the pinned keyword 1102. The pinned keywords 902, 1102 are fixedly highlighted within the interface 600 to facilitate identification by the recruiter 110. Further, in response to the recruiter 110 pinning the pinned keywords 902, 1102, the interface manager 212 dynamically hides, in real-time, one or more candidates of the list of candidates 608 that do not correspond with the pinned keyword 902 or the pinned keyword 1102. That is, the interface manager 212 hides those candidates that do not correspond with both of the pinned keywords 902, 1102 to facilitate the recruiter in identifying those candidates that do correspond with both of the pinned keywords 902, 1102.

Figure 12:
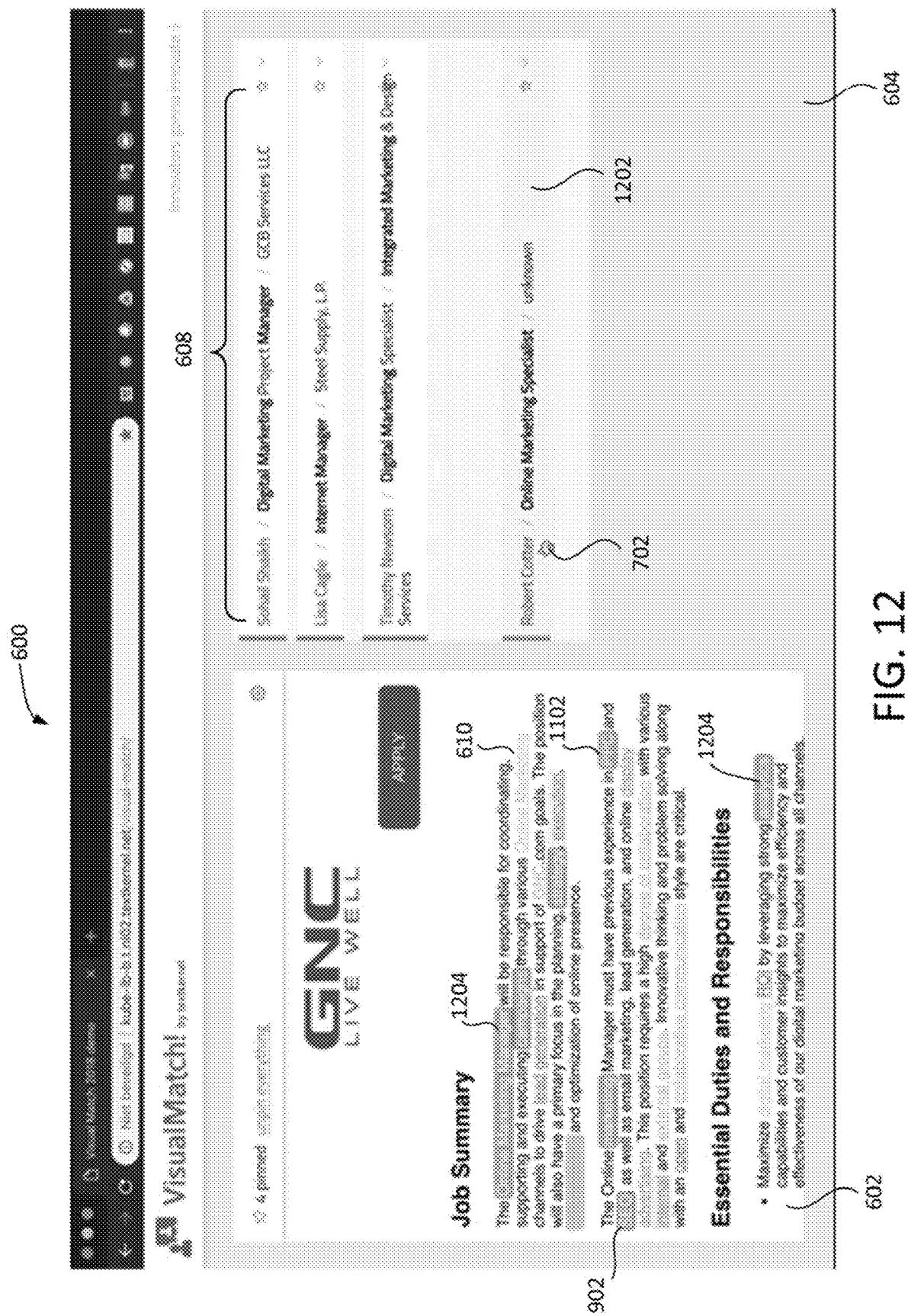
FIG. 12 further illustrates the automated interface of FIG. 6.

FIG. 12 illustrates another state of the interface 600 after the pinned keyword 902 and the pinned keyword 1102 have been pinned. In the illustrated example, the recruiter 110 is performing, via the cursor 702, a structured selection of a selected candidate 1202 within the list of candidates 608 presented in the candidate section 604 of the interface 600. When the selected candidate 1202 is being selected via a structured selection, the selected candidate 1202 is temporarily highlighted within the candidate section 604 by the interface manager 212. Further, when the selected candidate 1202 is being selected via a structured selection, one or more keywords 1204 of the keywords 610 that correspond to the selected candidate 1202 are highlighted by the interface manager 212. The selected candidate 1202 and the keywords 1204 are highlighted to facilitate the recruiter 110 in identifying relationships between the selected candidate 1202 and the keywords 610.

Figure 13:
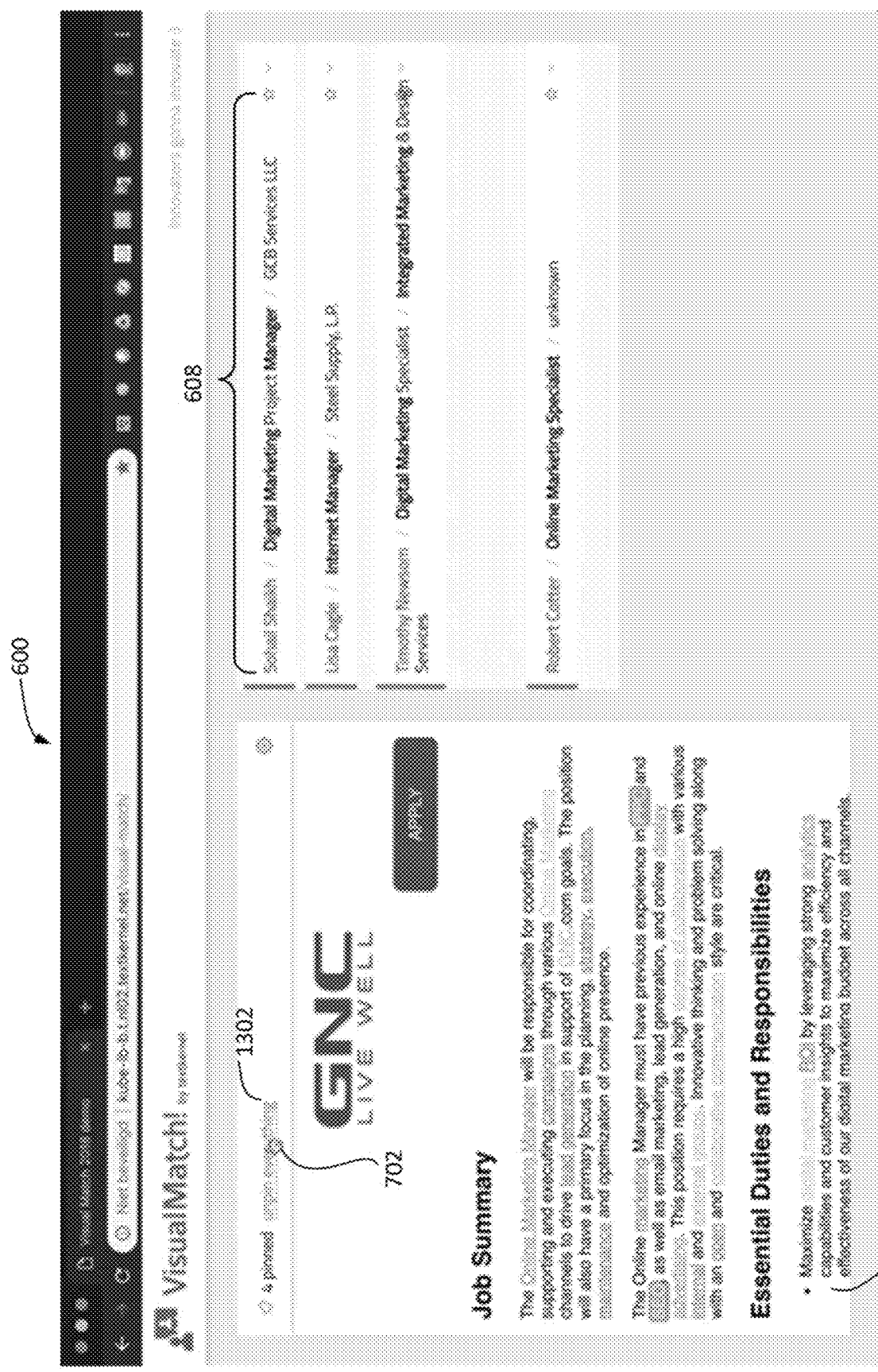
FIG. 13 further illustrates the automated interface of FIG. 6.

FIG. 13 illustrates another state of the interface 600 during which the recruiter 110 is performing a structured selection of an unpin button 1302 via the cursor 702.

Figure 14:
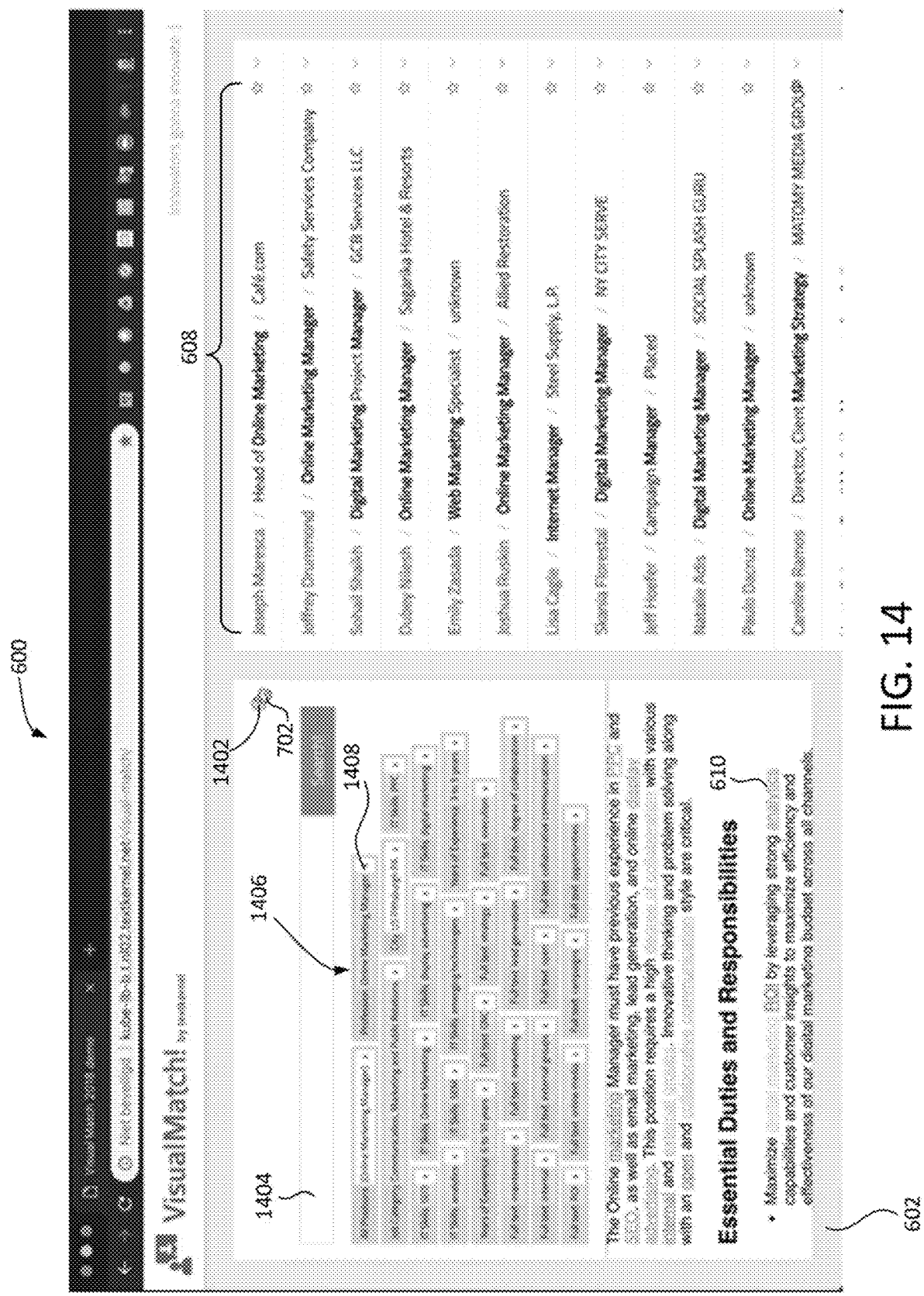
FIG. 14 further illustrates the automated interface of FIG. 6.

FIG. 14 illustrates another state of the interface 600 after which the interface manager 212 has unpinned the previously-pinned keywords. Further, FIG. 13 illustrates the interface 600 after the recruiter 110 has performed a structured selection of an search-term button 1402 via the cursor 702. As illustrated in FIG. 13, the interface manager 212 presents a textbox 1404 and search-terms 1406 within a dropdown box after the search-term button 1402 has been selected. The textbox 1404 is configured to receive an additional search-term and/or keyword from the recruiter 110. Further, the search-terms 1406 correspond with the keywords 610 typographically emphasized within the posting section 602. As illustrated in FIG. 14, the interface 600 includes a delete button 1408 for each of the search-terms 1406. In response to recruiter 110 selecting the delete button 1408 of one of the search-terms 1406, (i) the search-term generator 206 deletes that search-term from the search-terms 1406 utilized to identify the list of candidates 608, (ii) the interface manager 212 removes the deleted search-term from the dropdown box, (iii) the interface manager 212 typographically deemphasizes one or more of the keywords 610 that correspond with the deleted search-term, (iv) the candidate selector 208 dynamically updates the list of candidates 608 based on the remaining search-terms, and (v) the interface manager 212 presents the updated list of candidates 608.

Figure 15:
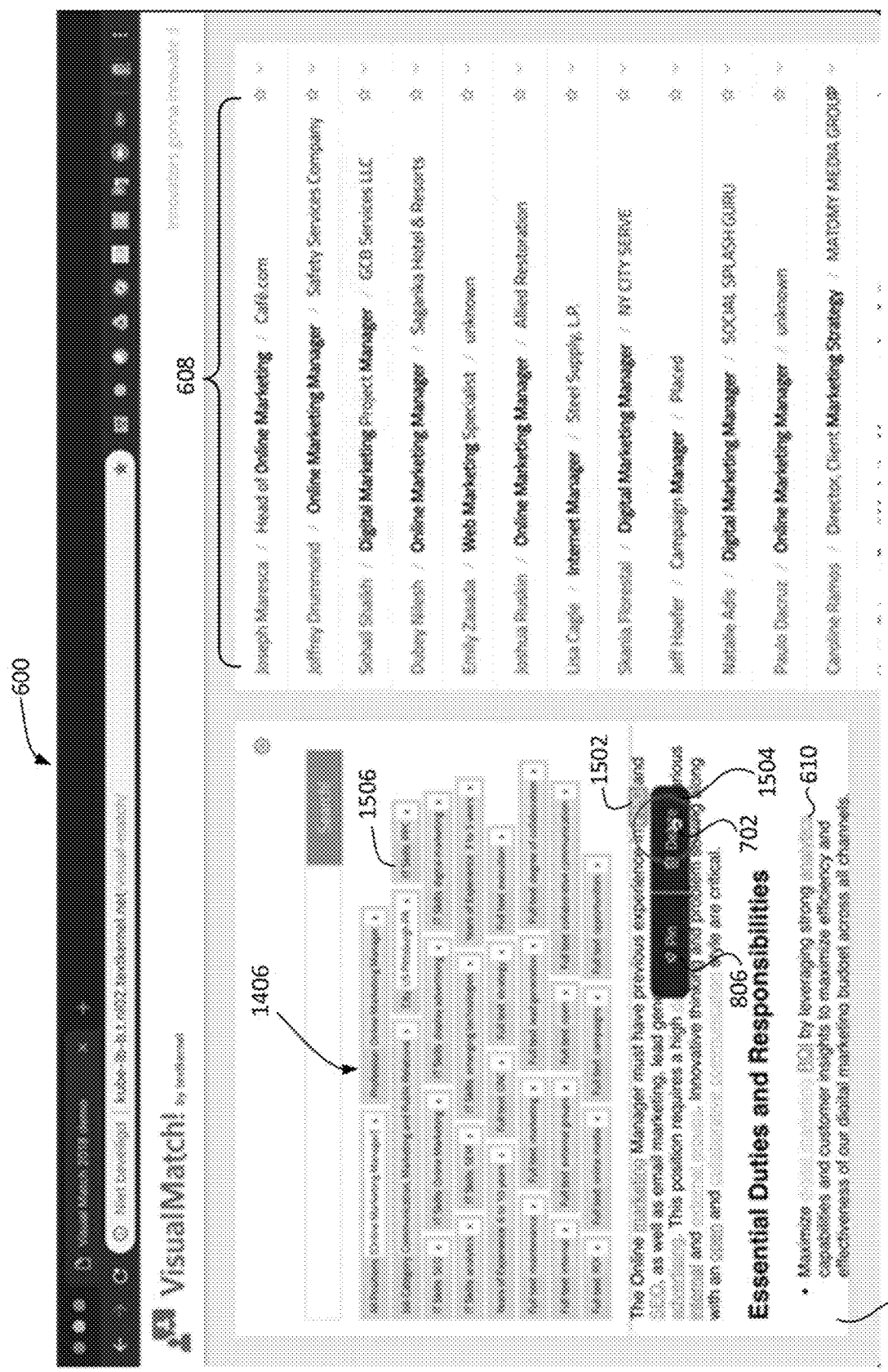
FIG. 15 further illustrates the automated interface of FIG. 6.

FIG. 15 illustrates another state of the interface 600 during which the recruiter 110 is selecting to delete one of the keywords 610 within the posting section 602. For example, to select one of the keywords 610 for deletion, the recruiter 110 first performs a structured selection of a selected keyword 1502. In the illustrated example, the selected keyword 1502 is highlighted. Further, the popup menu 806 is included within the interface 600 when the recruiter 110 performs a particular structured selection (e.g., clicking via the cursor 702) of the selected keyword 1502. When the recruiter 110 performs a structured selection of a delete button 1504 within the popup menu 806, the interface manager 212 typographically deemphasizes the selected keyword 1502 within the posting section 602. Further, the search-term generator 206 deletes a search-term 1506 corresponding with the selected keyword 1502 from the search-terms 1406 utilized to identify the list of candidates 608, (ii) the interface manager 212 removes the search-term 1506 from the dropdown box, (iii) the candidate selector 208 dynamically updates the list of candidates 608 based on the remaining search-terms, and (iv) the interface manager 212 presents the updated list of candidates 608.

Figure 16:
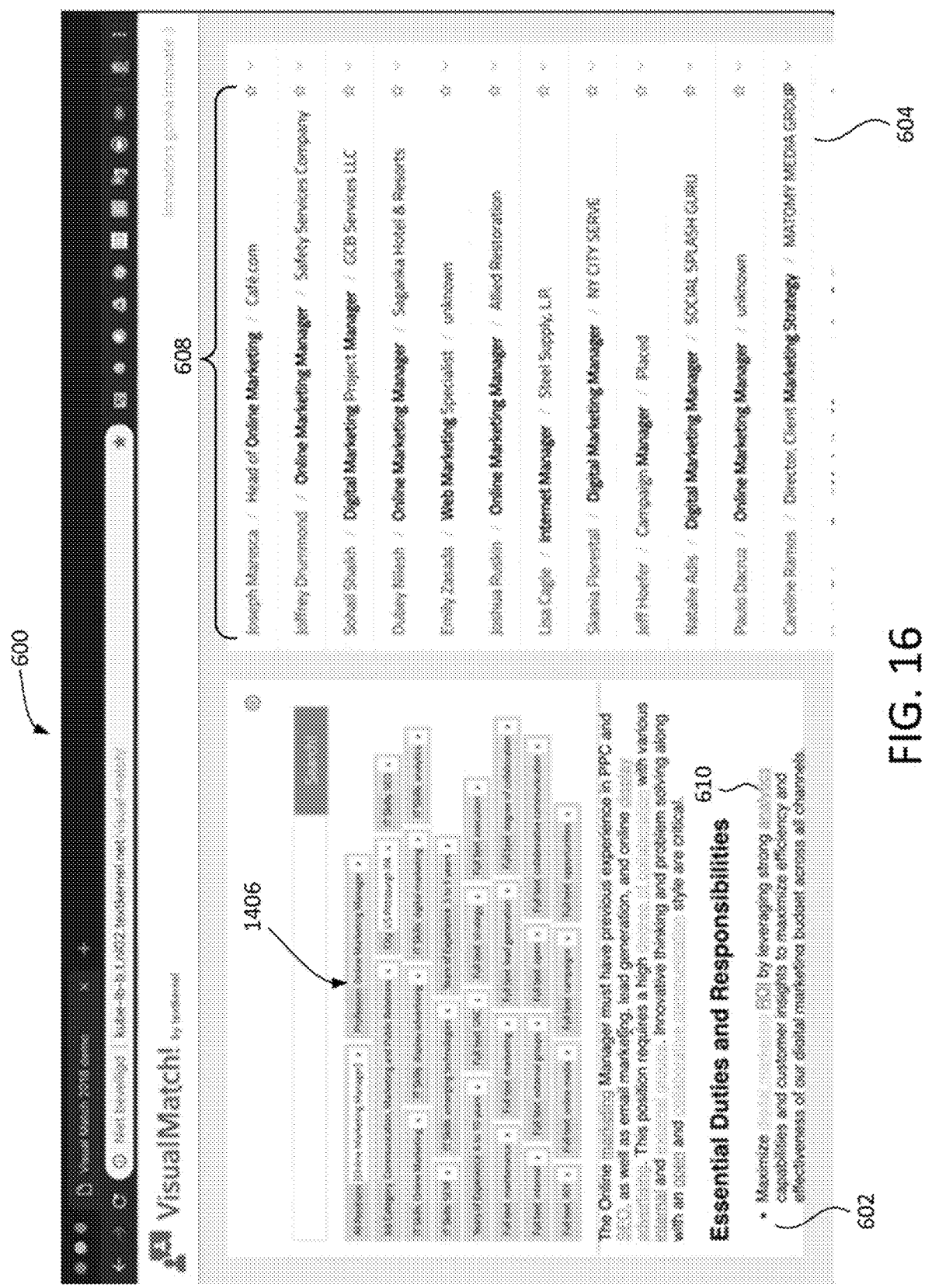
FIG. 16 further illustrates the automated interface of FIG. 6.

FIG. 16 illustrates another state of the interface 600 after the search-term 1506 has been deleted from the search-terms 1406. In the illustrated example, the interface manager 212 has updated the keywords 610 within the posting section 602 and the list of candidates 608 within the candidate section 604 to reflect the deletion of the search-term 1506.

Figure 17:
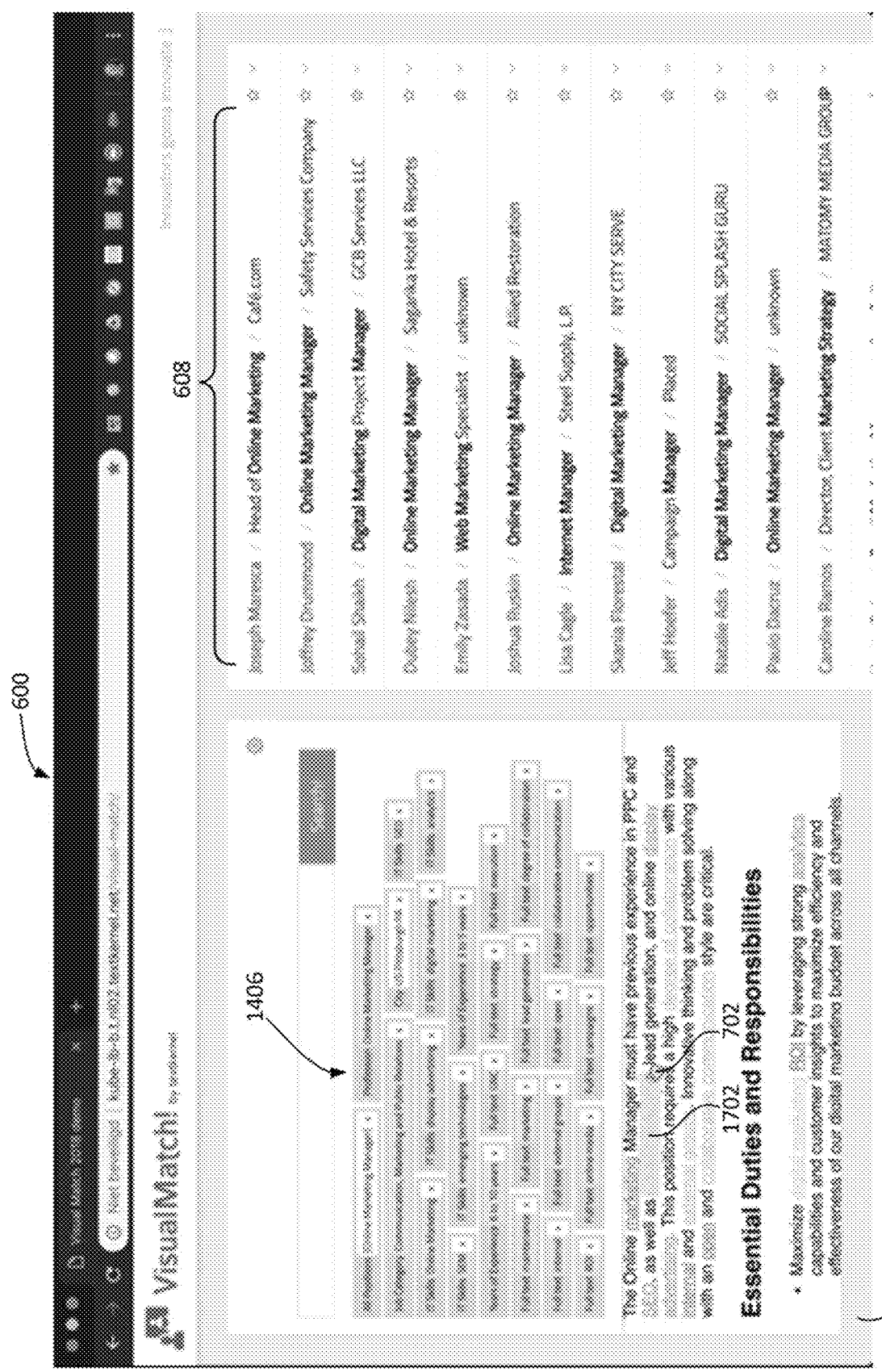
FIG. 17 further illustrates the automated interface of FIG. 6.

FIG. 17 illustrates another state of the interface 600 during which the recruiter 110 is performing a freeform selection of a phrase 1702 within the posting section 602. For example, the recruiter 110 is performing the freeform selection via the cursor 702 to create another keyword based on the phrase 1702. In the illustrated example, the recruiter 110 has selected (e.g., clicked, tapped, etc.) on and/or next to the phrase 1702 and subsequently dragged over the phrase 1702. The interface manager 212 temporarily highlights the phrase 1702 in the interface 600 as the recruiter 110 performs the freeform selection to indicate to the recruiter 110 that the freeform selection is being performed.

Figure 18:
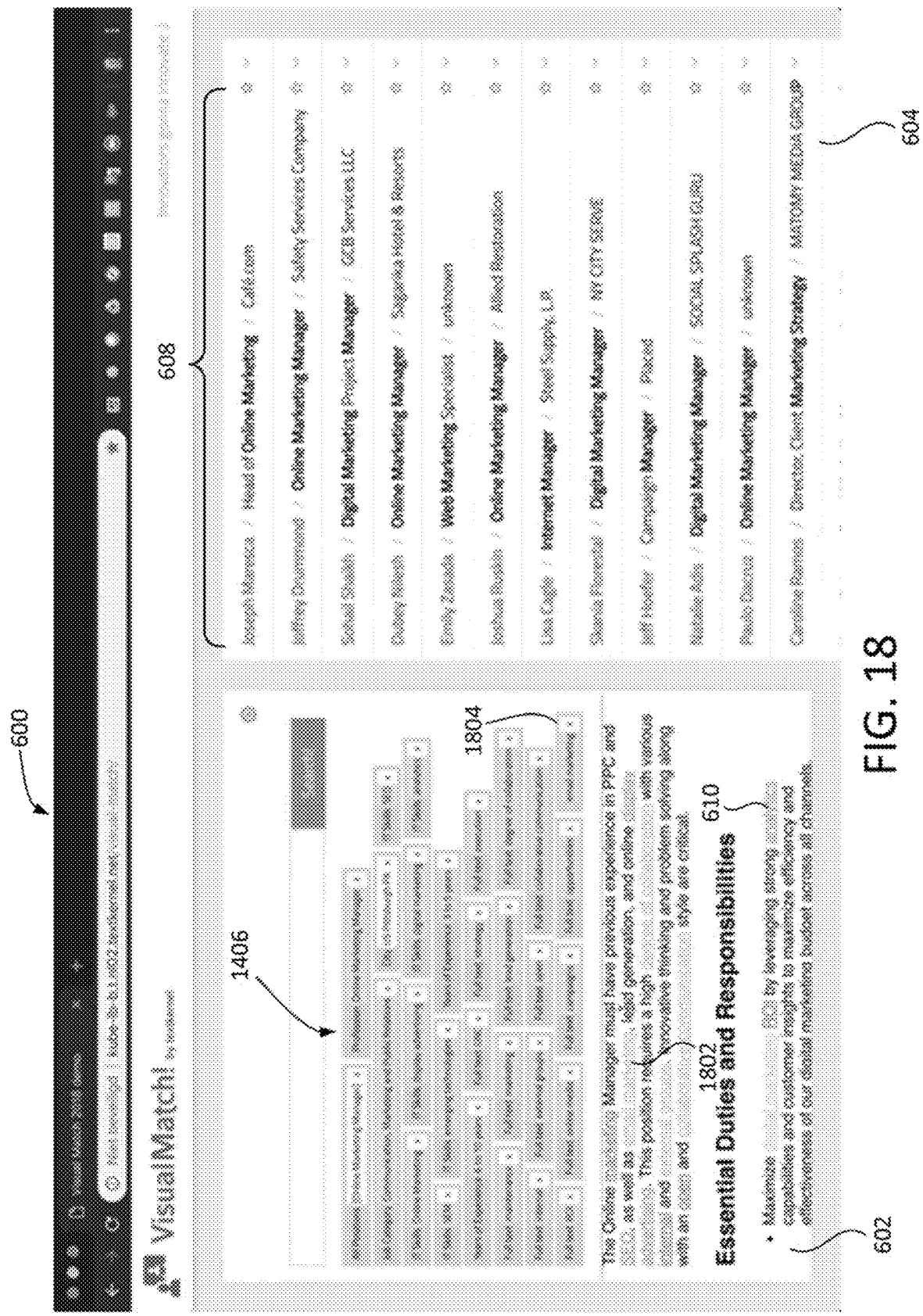
FIG. 18 further illustrates the automated interface of FIG. 6.

FIG. 18 illustrates another state of the interface 600 after the recruiter 110 has performed the freeform selection of the phrase 1702 of FIG. 17. In response to the recruiter 110 completing the freeform selection of the phrase 1702, keyword selector 204 automatically converts the phrase 1702 into another keyword 1802. Further, in response to the keyword 1802 being generated, (i) the interface manager 212 typographically emphasizes the keyword 1802 within the posting section 602, (ii) the search-term generator 206 identifies a search-term 1804 based on the keyword 1802, (iii) the interface manager 212 adds the search-term 1804 to the dropdown box, (iv) the candidate selector 208 dynamically updates the list of candidates 608 at least partially based on the search-term 1804, and (v) the interface manager 212 presents the updated list of candidates 608.

Figure 19:
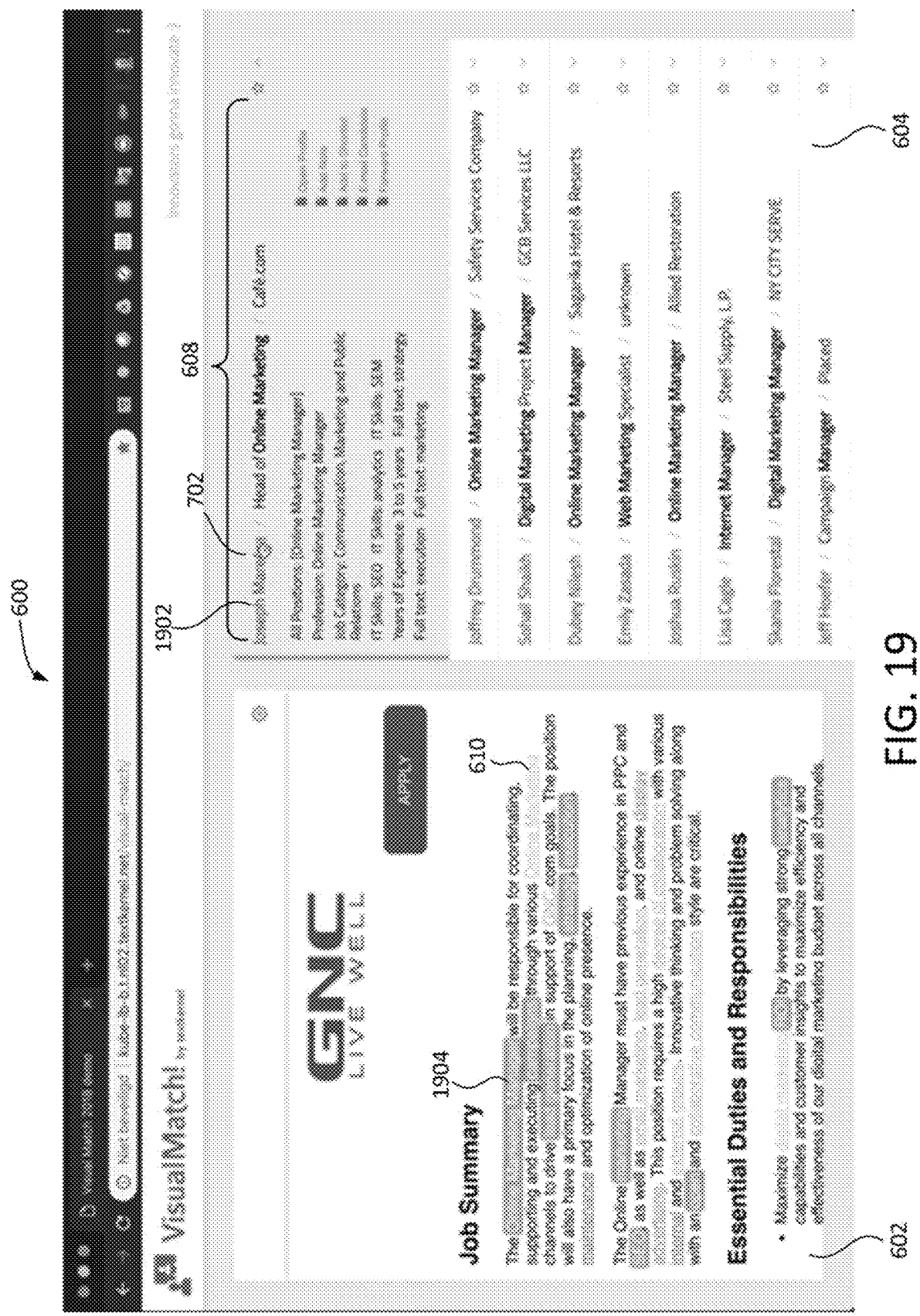
FIG. 19 further illustrates the automated interface of FIG. 6.

FIG. 19 illustrates another state of the interface 600 during which the recruiter 110 is performing a structured selection of a candidate name 1902 within the list of candidates 608 via the cursor 702. When the candidate name 1902 is selected via a structured selection, the interface manager 212 presents an expanded candidate summary that corresponds with the candidate name 1902 within the candidate section 604. Further, in the illustrated example, the interface manager 212 temporarily highlights the expanded candidate summary. Additionally or alternatively, when the candidate name 1902 is selected via a structured selection, one or more keywords 1904 of the keywords 610 presented within the posting section 602 are temporarily highlighted by the interface manager 212. For example, the candidate name 1902, the expanded candidate summary, and the keywords 1904 are highlighted to facilitate the recruiter 110 in identifying relationships between a candidate of the list of candidates 608 and the keywords 610 of the employment posting 606.

Figure 20:
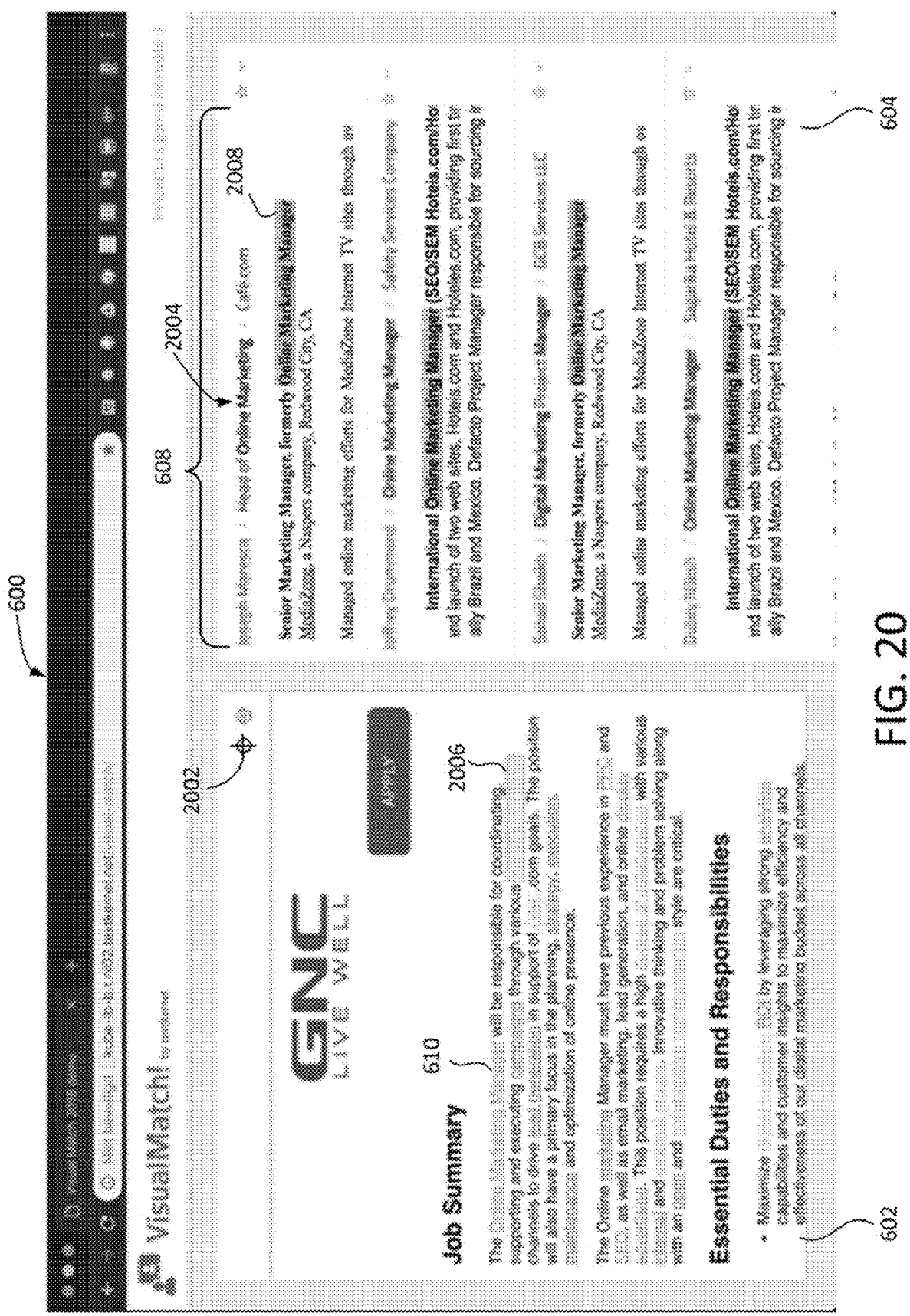
FIG. 20 further illustrates the automated interface of FIG. 6.

FIG. 20 illustrates another state of the interface 600 after which the recruiter 110 has selected a radar button 2002. In response to the recruiter 110 performing a structured selection of the radar button 2002, the interface manager 212 includes portions of candidate profiles 2004 of candidates within the list of candidates 608. As illustrated in FIG. 20, the portions of candidate profiles 2004 are presented within the candidate section 604 of the interface 600. Further, while the interface 600 is in a radar state, the interface manager 212 determines whether the recruiter 110 is performing a structured selection of one of the keywords 610 within the posting section 602. While detecting that the recruiter 110 is performing a structured selection (e.g., hovering over, clicking, tapping) of a selected keyword 2006, the interface manager 212 temporarily highlights (1) the selected keyword 2006 within the posting section 602 and (2) keywords 2008 within the portions of candidate profiles 2004 that correspond with the selected keyword 2006 to facilitate the recruiter 110 in identifying relationships between the selected keyword 2006 and the candidate profiles of the candidates included in the list of candidates 608.

Figure 21A:
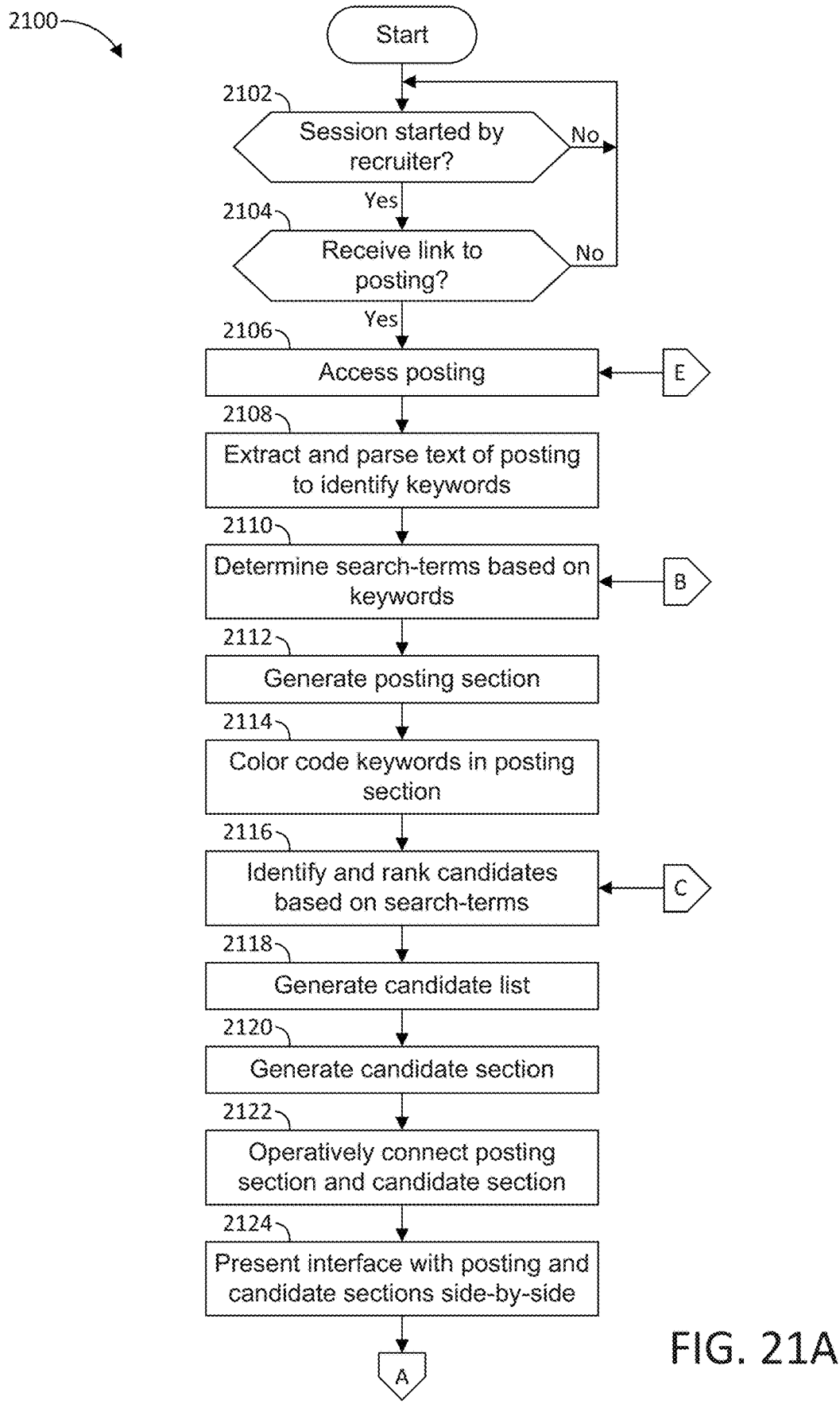
Figure 21B:
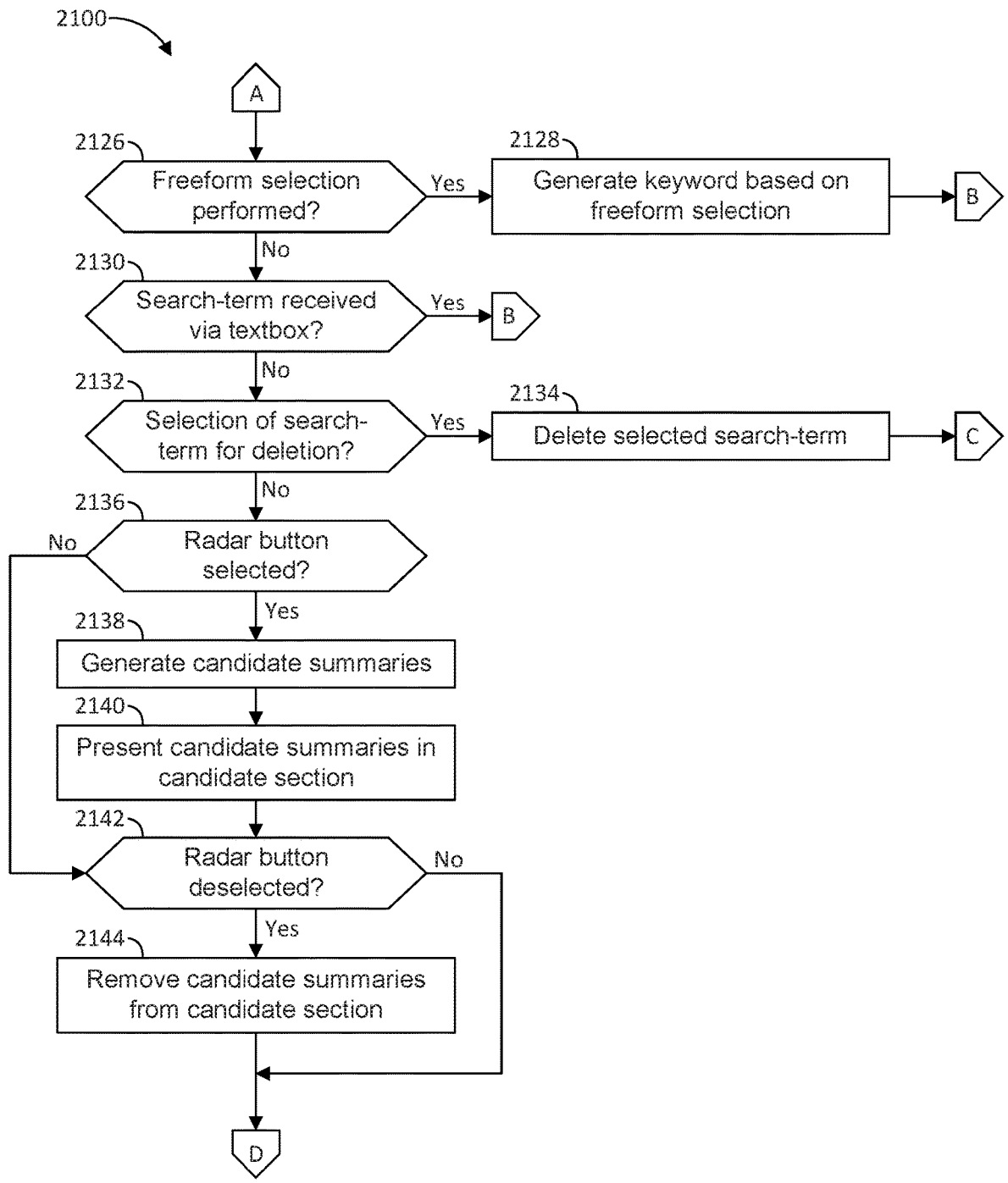

The flowchart of FIGS. 21A-21C is representative of machine readable instructions that are stored in memory (such as the memory 304 of FIG. 3) and include one or more programs which, when executed by one or more processors (such as the processor(s) 302 of FIG. 3), cause the employment website entity 100 to implement the example profile manager 202, the example keyword selector 204, the example search-term generator 206, the example candidate selector 208, the example keyword connector 210, and the interface manager 212 of FIGS. 2-3. While the example program is described with reference to the flowchart illustrated in FIGS. 21A-21C, many other methods of implementing the example profile manager 202, the example keyword selector 204, the example search-term generator 206, the example candidate selector 208, the example keyword connector 210, and/or the interface manager 212 may alternatively be used. For example, the order of execution of the blocks may be rearranged, changed, eliminated, and/or combined to perform the method 2100. Further, because the method 2100 is disclosed in connection with the components of FIGS. 1-20, some functions of those components will not be described in detail below.

Initially, at block 2102 of FIG. 21A, the processor(s) 302 determine whether the recruiter 110 has started a session on the employment website and/or app 112. In response to the processor(s) 302 determining that the recruiter 110 has not started such a session, the method 2100 remains at block 2102. Otherwise, in response to the processor(s) 302 determining that the recruiter 110 has started such a session, the method 2100 proceeds to block 2104.

At block 2104, the processor(s) 302 determine whether a link to an employment posting has been received. For example, processor(s) 302 receive such a link via a uniform resource locator (URL) and/or a built-in browser widget. In response to the processor(s) 302 determining that such a link has not been received, the method 2100 returns to block 2102. Otherwise, in response to the processor(s) 302 determining that such a link has been received, the method 2100 proceeds to block 2106.

At block 2106, the keyword selector 204 accesses the employment posting via the provided link. At block 2108, the keyword selector 204 identifies keywords 610 within the employment posting 606 by extracting and subsequently parsing the text of the employment posting 606. At block 2110, the search-term generator 206 determines search-terms 1406 based on the keywords 610. For example, the search-term generator 206 utilizes the keywords 610 to retrieve the search-terms 1406 from the search-term database 214.

At block 2112, the interface manager 212 generates the posting section 602 for the interface 600. For example, the interface manager 212 generates the posting section 602 to include the employment posting 606. At block 2114, the interface manager 212 color codes and/or otherwise typographically emphasizes the keywords 610 of the employment posting 606 within the posting section 602.

At block 2116, the candidate selector 208 identifies and ranks candidates based on the search-terms 1406. For example, the candidate selector 208 utilizes the search-terms 1406 to retrieve candidates from the profile database 216. The candidate selector 208 ranks candidates based on how similar keywords of candidate profiles of the candidates are to the search-terms 1406. At block 2118, the candidate selector 208 generates the list of candidates 608 that correspond with the search-terms 1406 for the employment posting 606. For example, the candidate selector 208 includes a predetermined number of the highest-ranked candidates in the list of candidates 608. At block 2120, the interface manager generates the candidate section 604 to include the list of candidates 608.

At block 2122, the keyword connector 210 operatively connects the posting section 602 with the candidate section 604 of the interface 600. For example, the keyword connector 210 operatively connects the keywords 610 with the search-terms 1406. Further, the keyword connector 210 is configured to operatively connect the keywords 610 and/or the search-terms 1406 with the candidates, the candidate profiles of those candidates, and/or the keywords of those candidate profiles included in the list of candidates 608. At block 2124, the interface manager 212 presents the interface 600 that includes the posting section 602 and the candidate section 604 side-by-side.

Turning to FIG. 21B, at block 2126, the interface manager 212 determines whether a freeform selection has been performed by the recruiter 110 within the text of the employment posting 606 in the posting section 602. In response to the interface manager 212 determining that the recruiter 110 has performed such a freeform selection, the method proceeds to block 2128 at which the keyword selector 204 generates an additional keyword based on the selected text of the freeform selection. After block 2128 is completed, the method 2100 returns to block 2110. Returning to block 2126, in response to the interface manager 212 determining that the recruiter 110 has not performed such a freeform selection, the method 2100 proceeds to block 2130 at which the interface manager 212 determines whether an additional search-term has been received via the textbox 1404 of the interface 600. In response to the interface manager 212 determining that a search-term has been received via the textbox 1404, the method 2100 returns to block 2110. Otherwise, in response to the interface manager 212 determining that a search-term has not been received via the textbox 1404, the method 2100 proceeds to block 2132.

At block 2136, the interface manager 212 determines whether the recruiter 110 has selected one of the search-terms 1406 for deletion. For example, the interface manager 212 detects that one of the search-terms 1406 has been selected for deletion in response to detecting a structured selection of the one of the delete buttons 1408, 1504. In response to the interface manager 212 determining that one of the search-terms 1406 has been selected for deletion, the method 2100 proceeds to block 2134 at which the search-term generator 206 deletes the selected one of the search-terms 1406. After block 2134 is completed, the method 2100 returns to block 2116. Returning to block 2132, in response to the interface manager 212 determining that one of the search-terms 1406 has not been selected for deletion, the method 2100 proceeds to block 2136.

At block 2136, the interface manager 212 determines whether the radar button 2002 has been selected via a structured selection. In response to the interface manager 212 determining that the radar button 2002 has not been selected, the method 2100 proceeds to block 2142. Otherwise, in response to the interface manager 212 determining that the radar button 2002 has been selected, the method 2100 proceeds to block 2138 at which the interface manager 212 generates the portions of candidate profiles 2004 for the candidates included in the list of candidates 608. At block 2140, the interface manager 212 dynamically modifies the candidate section 604 of the interface 600 in real-time to include the portions of candidate profiles 2004.

At block 2142, the interface manager 212 determines whether the radar button 2002 has been deselected via a structured selection. In response to the interface manager 212 determining that the radar button 2002 has not been deselected, the method 2100 proceeds to block 2146. Otherwise, in response to the interface manager 212 determining that the radar button 2002 has been deselected, the method 2100 proceeds to block 2144 at which the interface manager 212 dynamically removes the portions of candidate profiles 2004 from the candidate section 604 of the interface 600 in real-time.

Turning to FIG. 21C, at block 2146, the interface manager 212 determines whether a structured selection of one of the keywords 610 has been performed. In response to the interface manager 212 determining that such a structured selection has not been performed, the method 2100 proceeds to block 2152. Otherwise, in response to the interface manager 212 determining that such a structured selection has been performed, the method 2100 proceeds to block 2148 at which the interface manager 212 temporarily highlights the selected keyword (e.g., the selected keyword 704, the selected keyword 802). At block 2150, the interface manager 212 temporarily highlights the candidates within the list of candidates 608 that correspond with the selected keyword. In examples in which the radar button 2002 has been selected, the interface manager 212 temporarily highlights the selected keywords included in the portions of candidate profiles 2004 within the list of candidates 608.

At block 2152, the interface manager 212 determines whether one of the keywords 610 has been pinned (e.g., via structured selections of one of the keywords 610 and the pin button 808). In response to the interface manager 212 determining that one of the keywords 610 has not been pinned, the method 2100 proceeds to block 2158. Otherwise, in response to the interface manager 212 determining that one of the keywords 610 has been pinned, the method 2100 proceeds to block 2154 at which the interface manager fixedly highlights the pinned one of the keywords 610 (e.g., the pinned keyword 902, the pinned keyword 1102). At block 2156, the interface manager 212 dynamically hides, in real-time, one or more candidates within the list of candidates 608 that do not correspond with the pinned keyword.

At block 2158, the interface manager 212 determines whether a structured selection of one of the candidates within the list of candidates 608 has been performed. In response to the interface manager 212 determining that such a structured selection has not been performed, the method 2100 proceeds to block 2164. Otherwise, in response to the interface manager 212 determining that such a structured selection has been performed, the method 2100 proceeds to block 2160 at which the interface manager 212 temporarily highlights the selected candidate (e.g., the selected candidate 1202). At block 2162, the interface manager 212 temporarily highlights the keywords (e.g., the keywords 1204) within the employment posting 606 that correspond with the selected candidate.

At block 2164, the processor(s) 302 determine whether a link to another employment posting has been received. In response to the processor(s) 302 determining that such a link has been received, the method 2100 returns to block 2106. Otherwise, in response to the processor(s) 302 determining that such a link has not been received, the method 2100 proceeds to block 2166 at which the processor(s) 302 determine whether the recruiter 110 has ended the session on the employment website and/or app 112. In response to the processor(s) 302 determining that the recruiter 110 has not ended the session, the method 2100 returns to block 2126. Otherwise, in response to the processor(s) 302 determining that the recruiter 110 has ended the session, the method 2100 ends.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A system for interactively presenting candidates for an employment posting to a recruiter, the system comprising:
   a profile database configured to store candidate profiles of the candidates, the candidate profiles including profile keywords;
   a search-term database configured to store posting search-terms and associate them with posting keywords; and
   one or more processors used to operate an employment website, wherein, in real-time while the recruiter is interacting with the employment website, the one or more processors are configured to:
      access the employment posting;
      extract text of the employment posting;
      identify one or more posting keywords by parsing the extracted text of the employment posting;
      retrieve one or more posting search-terms from the search-term database based on the one or more posting keywords;
      retrieve one or more of the candidate profiles from the profile database based on the one or more posting search-terms;
      generate a list of candidates associated with the one or more of the candidate profiles retrieved from the profile database;
      simultaneously present to the recruiter through the website an interface having a posting section next to a candidate section, wherein the posting section includes the employment posting and the candidate section includes the list of candidates; and
      typographically emphasize, in real-time, the one or more posting keywords where they appear within the employment posting;
      wherein, when the recruiter selects, via a cursor, a selected candidate from the list of candidates in the candidate section, the one or more processors are further configured to visually indicate, in real-time, the posting keywords in the posting section that appear within the candidate profile of the selected candidate.

2. The system of claim 1, wherein the one or more processors are further configured to generate the candidate profiles stored in the profile database based on, at least in part, resumes of candidates collected via the employment website or app.

3. The system of claim 2, wherein, to generate the candidate profiles, the one or more processors are configured to extract and parse text of the resumes.

4. The system of claim 1, wherein, to access the employment posting, the one or more processors are configured to receive a uniform resource locator from the recruiter via the employment website or app.

5. The system of claim 1, wherein the one or more processors are configured to access the employment posting via a built-in widget.

6. The system of claim 1, wherein, to generate the list of candidates, the one or more processors are configured to rank the one or more candidate profiles based on how closely they correspond with the one or more posting search-terms.

7. The system of claim 6, wherein the one or more processors are configured to utilize the one or more posting search-terms that are identified based on the one or more posting keywords to increase a quality of a ranking of the one or more candidate profiles.

8. The system of claim 1, wherein, to typographically emphasize the posting keywords within the posting section, the posting keywords are highlighted with one or more colors.

9. The system of claim 8, wherein the one or more processors are further configured to:
   categorize the posting keywords by types including at least job title and skill requirements; color code the different types of posting keyboards; and
   typographically emphasize the posting keywords by highlighting them in colors associated with their type.

10. The system of claim 1, wherein the one or more processors are configured to:
    in response to a recruiter having hovered the cursor over a first typographically emphasized posting keyword within the posting section,
    temporarily highlight, in real-time and within the candidate section, each candidate from within the list of candidates that has a candidate profile containing the first posting keyword.

11. The system of claim 1, wherein, in response to the recruiter pinning a first posting keyword of the one or more posting keywords within the posting section, the one or more processors are configured to:
    fixedly highlight the first posting keyword within the posting section; and
    dynamically hide, within the candidate section, each candidate in the list of candidates that does not correspond with the first posting keyword.

12. The system of claim 1, wherein the one or more processors are configured to receive an additional search-term from the recruiter via the interface and dynamically adjust the list of candidates based on the additional search-term.

13. The system of claim 12, wherein the one or more processors are configured to receive the additional search-term via a textbox of the interface.

14. The system of claim 12, wherein, to receive the additional search-term, the one or more processors are configured to:
    identify when the recruiter has performed a freeform selection of a portion of the text of the employment posting within the posting section;
    automatically convert the portion into a new posting keyword;
    retrieve one or more additional search-terms from the search-term database based on the new posting keyword; and
    dynamically adjust the list of candidates based on the one or more additional search-terms.

15. The system of claim 1, wherein the one or more processors are configured to present an expanded candidate summary within the candidate section in response to determining that the recruiter has performed a structured selection of a corresponding candidate name within the list of candidates in the candidate section.

16. The system of claim 1, wherein, in response to the recruiter performing a structured selection of a radar button of the interface, the one or more processors are configured to:

present, in the candidate section, a portion of a candidate profile for each candidate within the list of candidates;

determine when the recruiter performs a structured selection of a first posting keyword of the one or more posting keywords typographically emphasized within the posting section; and temporarily highlight the first posting keyword within one or more of the candidate profiles within the candidate section while the structured selection is being performed.

17. A method for interactively presenting candidates for an employment posting while a recruiter is interacting with an employment website, the method comprising:

accessing, via one or more processors, the employment posting;

extracting, via the one or more processors, text of the employment posting;

identifying, via the one or more processors, one or more posting keywords by parsing the extracted text of the employment posting;

retrieving, via the one or more processors, one or more posting search-terms from a search-term database based on the one or more posting keywords, wherein the search-term database stores associations between keywords and search-terms;

retrieving, via the one or more processors, one or more of the candidate profiles from a profile database based on the one or more posting search-terms, wherein the profile database stores candidate profiles of the candidates and the candidate profiles include profile keywords;

generating, via the one or more processors, a list of candidates associated with the one or more of the candidate profiles retrieved from the profile database;

simultaneously presenting, via the one or more processors, to the recruiter through the website an interface having a posting section next to a candidate section, wherein the posting section includes the employment posting and the candidate section includes the list of candidates;

typographically emphasizing, in real-time and via the one or more processors, the posting keywords where they appear within the employment posting; and upon the recruiter selecting, via a cursor, a selected candidate from the list of candidates in the candidate section, visually indicating, in real-time and through the interface the posting keywords in the posting section that appear within the candidate profile of the selected candidate.

18. A tangible computer readable medium including instructions which, when executed, cause a machine to interactively present candidates for an employment posting while a recruiter is interacting with an employment website by causing the machine to:

access the employment posting;

extract text of the employment posting;

identify one or more posting keywords by parsing the extracted text of the employment posting;

retrieve one or more posting search-terms from the search-term database based on the one or more posting keywords;

retrieve one or more of the candidate profiles from a profile database based on the one or more posting search-terms, wherein the profile database stores candidate profiles of the candidates and the candidate profiles include profile keywords;

generate a list of candidates associated with the one or more of the candidate profiles retrieved from the profile database;

simultaneously present to the recruiter through the website an interface having a posting section next to a candidate section, wherein the posting section includes the employment posting and the candidate section includes the list of candidates; and typographically emphasize, in real-time, the one or more posting keywords where they appear within the employment posting;

wherein, when the recruiter selects, via a cursor, a selected candidate from the list of candidates in the candidate section, the one or more processors are further configured to visually indicate, in real-time, the posting keywords in the posting section that appear within the candidate profile of the selected candidate.

19. The system of claim 1 wherein the one or more processors are further configured to recognize selection of a candidate from the list of candidates by the recruiter when the cursor is hovered over the candidate to be selected.

20. The system of claim 1 wherein the processors typographically emphasize the one or more posting keywords by presenting them in a bold font and the one or more processors visually indicate the posting keywords in the posting section that appear within the candidate profile of the selected candidate by highlighting those posting keywords.

* * * * *